(12) United States Patent
Capecci et al.

(10) Patent No.: US 9,167,079 B1
(45) Date of Patent: Oct. 20, 2015

(54) SUBSCRIBER CABLE PAIR IDENTIFICATION

(71) Applicants: Dennis W Capecci, Finksburg, MD (US); David L Spaay, Naperville, IL (US); David L Brugman, San Clemente, CA (US)

(72) Inventors: Dennis W Capecci, Finksburg, MD (US); David L Spaay, Naperville, IL (US); David L Brugman, San Clemente, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/444,591

(22) Filed: Jul. 28, 2014

(51) Int. Cl.
*H04M 1/24* (2006.01)
*H04M 3/08* (2006.01)
*H04M 3/22* (2006.01)

(52) U.S. Cl.
CPC .................................... *H04M 3/229* (2013.01)

(58) Field of Classification Search
CPC ... H04M 3/007; H04M 3/306; H04M 3/2209; H04B 3/46; H04L 29/12254; H04L 61/2038; H04Q 2213/13039; H04Q 11/45
USPC ......... 379/1.01, 9, 9.06, 10.01, 22, 22.07, 23, 379/24, 27.01, 27.05, 29.01, 27.07, 29.11, 379/30
See application file for complete search history.

(56) References Cited

U.S. PATENT DOCUMENTS

| | | | |
|---|---|---|---|
| 5,436,953 A * | 7/1995 | Nilson ........................ 379/27.01 |
| 6,453,033 B1 * | 9/2002 | Little et al. ..................... 379/219 |
| 7,027,405 B1 * | 4/2006 | Khadavi ......................... 370/244 |
| 8,027,807 B2 * | 9/2011 | May et al. ...................... 702/183 |
| 8,180,023 B2 * | 5/2012 | Brugman et al. ........... 379/27.01 |
| 2002/0122552 A1 * | 9/2002 | Liu ............................ 379/399.01 |
| 2006/0072708 A1 * | 4/2006 | Warner et al. ................. 379/1.03 |
| 2006/0109979 A1 * | 5/2006 | Afzal et al. .............. 379/399.01 |
| 2007/0153981 A1 * | 7/2007 | Afzal et al. ....................... 379/22 |
| 2007/0230667 A1 * | 10/2007 | Warner et al. ............... 379/27.01 |
| 2012/0230475 A1 * | 9/2012 | Kristensen ....................... 379/25 |

* cited by examiner

*Primary Examiner* — Binh Tieu
(74) *Attorney, Agent, or Firm* — Wall & Tong, LLP

(57) ABSTRACT

A capability for subscriber cable pair identification is presented. The capability for subscriber cable pair identification may be configured to support subscriber cable identification for Plain Old Telephone Service (POTS) cable pairs, Integrated Services Digital Network (ISDN) cable pairs, or both POTS and ISDN cable pairs. The subscriber cable pair identification may be performed using a subscriber cable pair identification assembly including a computing device, a probe interface device, and a probe, where the computing device is configured to run a control program configured to control subscriber cable pair identification, the probe interface device is configured as an interface between the computing device and the probe, and the probe is configured to be connected to a unit supporting subscriber cable pairs.

18 Claims, 13 Drawing Sheets

POTS FORWARD/REVERSE VOLTAGE DETECTION MODULE 340

SUBSCRIBER CABLE PAIR IDENTIFICATION

TECHNICAL FIELD

The disclosure relates generally to communication systems and, more specifically but not exclusively, to subscriber cable pair identification in communication systems.

BACKGROUND

Subscribers are commonly provided with telephone service known as Plain Old Telephone Service (POTS). Alternatively, many subscribers now utilize Integrated Services Digital Network (ISDN) services in place of POTS for telephone service as well as other services which may be supported. It is relatively common for service providers supporting POTS and ISDN services to maintain subscriber connection records for such services. The subscriber connection records for POTS and ISDN services typically include mappings between the telephone numbers of the subscribers and the subscriber cable pair assignments for the subscribers. However, subscriber connection records typically become corrupted over time. Thus, there is a need for a capability for performing subscriber cable pair identification for POTS services subscribers and ISDN services subscribers.

SUMMARY OF EMBODIMENTS

Various deficiencies in the prior art are addressed by embodiments for supporting subscriber cable pair identification.

In at least some embodiments, an apparatus includes a processor and a memory communicatively connected to the processor, where the processor is configured to control application of a resistance element of a probe interface device across a probe configured to be connected to a unit supporting a subscriber cable pair and is configured to determine whether a resistance of the resistance element is detected at a test position of a switch serving the subscriber cable pair.

In at least some embodiments, a method includes steps of using a processor and a memory for controlling application of a resistance element of a probe interface device across a probe configured to be connected to a unit supporting the subscriber cable pair and for determining whether a resistance of the resistance element is detected at a test position of a switch serving the subscriber cable pair.

In at least some embodiments, a computer-readable storage medium stores instructions which, when executed by a computer, cause the computer to perform a method including steps of controlling application of a resistance element of a probe interface device across a probe configured to be connected to a unit supporting the subscriber cable pair and determining whether a resistance of the resistance element is detected at a test position of a switch serving the subscriber cable pair.

In at least some embodiments, a computing device includes a first communication interface configured for communication with a switch serving a subscriber cable pair, a second communication interface configured for communication with a probe interface device configured to operate as an interface between the computing device and a probe configured to be connected to a unit supporting the subscriber cable pair, and a processor configured to control application of a resistance element of the probe interface device across the probe and to determine whether a resistance of the resistance element is detected at a test position of the switch.

In at least some embodiments, a probe interface device includes a probe interface configured for communication with a probe configured to be connected to a unit supporting a subscriber cable pair, a communication interface configured for communication with a computing device, and a resistance element control circuit comprising a resistance element where the resistance element control circuit is configured to apply the resistance element across the probe based on a control signal from the computing device.

In at least some embodiments, an assembly includes a probe configured to be connected to a unit supporting a subscriber cable pair, a probe interface device communicatively connected to the probe, the probe interface device comprising a resistance element, and a computing device communicatively connected to the probe interface device where the computing device configured to control application of the resistance element across the probe and to determine whether a resistance of the resistance element is detected at a test position of a switch serving the subscriber cable pair.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A capability for subscriber cable pair identification is presented. The capability for subscriber cable pair identification for a subscriber cable pair may be configured to support identification or validation of an association between the subscriber cable pair and one or both of a telephone number or a line port on a switch providing service to a subscriber via the subscriber cable pair. The capability for subscriber cable pair identification may be configured to support subscriber cable pair identification for Plain Old Telephone Service (POTS) subscriber cable pairs, Integrated Services Digital Network (ISDN) subscriber cable pairs, or both POTS subscriber cable pairs and ISDN subscriber cable pairs. The subscriber cable pair identification for a POTS subscriber cable pair may include identification or validation of an association between the POTS subscriber cable pair and a telephone number and/or a POTS line port for the POTS subscriber cable pair. The subscriber cable pair identification for an ISDN subscriber cable pair may include identification or validation of an association between the ISDN subscriber cable pair and a telephone number and/or an ISDN line port for the ISDN subscriber cable pair. In at least some embodiments, subscriber cable pair identification is performed using a subscriber cable pair identification assembly including a computing device, a probe interface device, and a probe, where the computing device is configured to run a control program configured to control subscriber cable pair identification, the probe interface device is configured as an interface between the computing device and the probe, and the probe is configured to interface with a cable pair. These and various other embodiments and advantages of the capability for subscriber cable pair identification may be better understood by way of reference to the exemplary system of FIG. 1.

Figure 1:
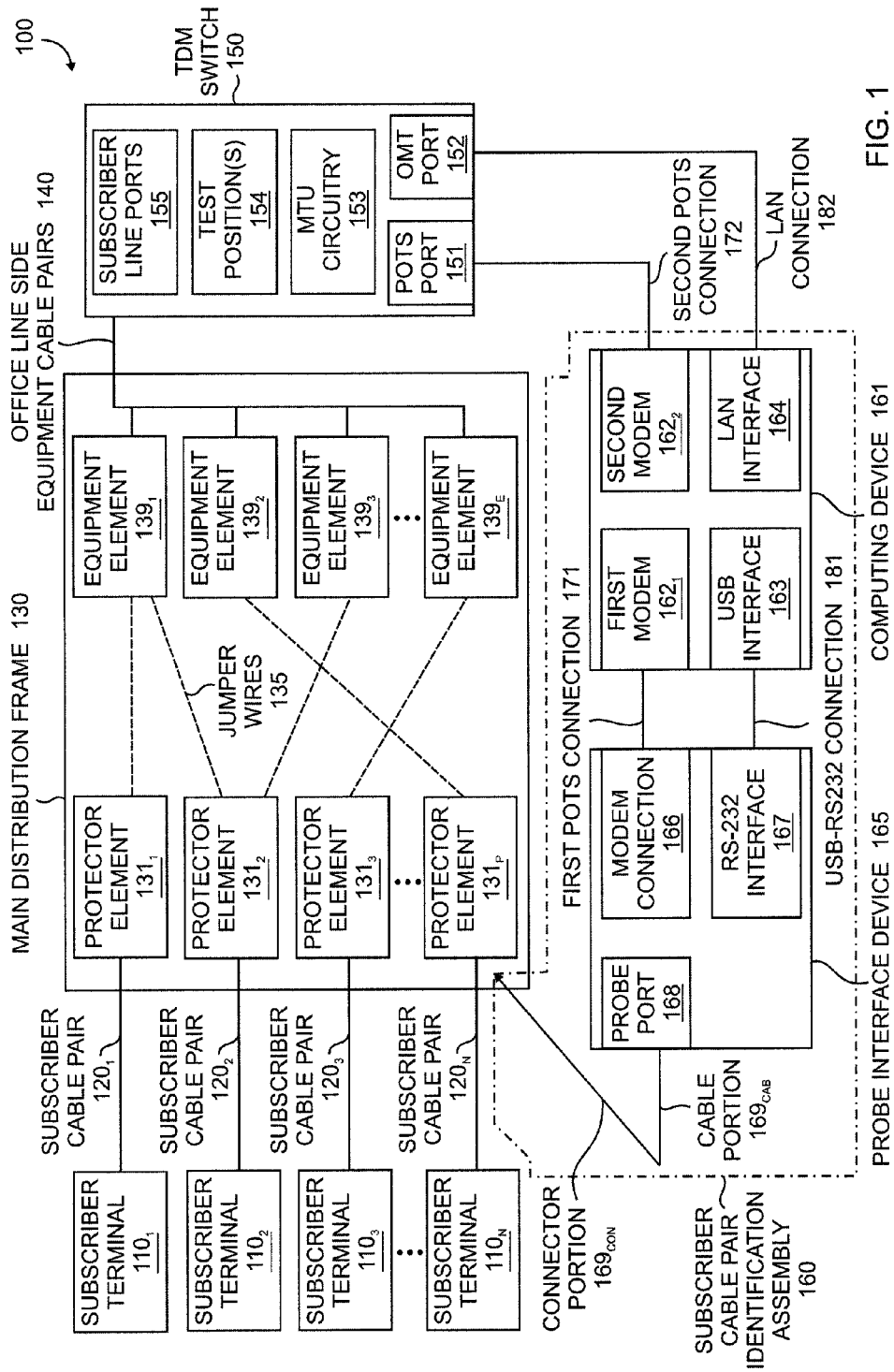
FIG. 1 depicts an exemplary system including a subscriber cable pair identification assembly configured to identify subscriber cable pairs connecting subscriber terminals to a communication network.

FIG. 1 depicts an exemplary system including a subscriber cable pair identification assembly configured to identify subscriber cable pairs connecting subscriber terminals to a communication network.

As depicted in FIG. 1, system 100 includes a plurality of subscriber terminals $110_1$-$110_N$ (collectively, subscriber terminals 110), a plurality of subscriber cable pairs $120_1$-$120_N$ (collectively, subscriber cable pairs 120) associated with the respective subscriber terminals $110_1$-$110_N$, a main distribution frame (MDF) 130 configured to serve the subscriber terminals 110 via the subscriber cable pairs 120, office line side equipment cable pairs 140 configured to support network-facing line side service functions (POTS and ISDN) of main distribution frame 130, a time division multiplexing (TDM) switch 150 communicatively connected to MDF 130 via office line side equipment cable pairs 140, and a subscriber cable pair identification assembly 160.

The subscriber terminals 110 may include POTS-based terminals, ISDN-based terminals, or a combination of POTS-based terminals and ISDN-based terminals. For example, subscriber terminals 110 may be POTS-based telephones, ISDN-based telephones, or the like, as well as various combinations thereof. It will be appreciated that the subscriber terminals 110 have telephone numbers associated therewith, respectively.

The subscriber cable pairs 120 are communication links between the subscriber terminals 110 and the MDF 130 serving the subscriber terminals 110. The subscriber cable pairs 120 may include telephone lines supporting telephone service for the subscriber terminals 110. The typical configuration of subscriber cable pairs 120 for POTS-based terminals and ISDN-based terminals will be understood by one skilled in the art. It will be appreciated that the subscriber cable pairs 120 have telephone numbers associated therewith, respectively, and that the service provider that provides telephone service to the associated subscriber terminals 110 is expected to maintain records including mappings between the subscriber cable pairs 120 and the telephone numbers associated with subscriber cable pairs 120. However, as discussed further below, records including mappings between subscriber cable pairs 120 and the telephone numbers associated with subscriber cable pairs 120 may be corrupted over time (e.g., such as where technicians in the field move subscriber terminals 110 between subscriber cable pairs 120 without updating the records including the mappings between subscriber cable pairs 120 and the telephone numbers associated with subscriber cable pairs 120).

The MDF 130 is a main distribution frame that is configured to serve the subscriber terminals 110 via the subscriber cable pairs 120, respectively. In general, an MDF is typically configured to connect outside plant (e.g., subscriber cable pairs 120 and subscriber terminals 110) to inside plant (e.g., TDM switch 150) and, although the typical configuration of an MDF will be understood by one skilled in the art, a brief description of the configuration of MDF 130 is provided for purposes of completeness. The MDF 130 includes a set of protector elements $131_1$-$131_P$ (collectively, protector elements 131) and a set of equipment elements $139_1$-$139_E$ (collectively, equipment elements 139) connected via a set of jumper wires 135. The protector elements 131 terminate the subscriber cable pairs 120 from the subscriber terminals 110. In the exemplary MDF 130 of FIG. 1, subscriber terminal $110_1$ terminates on protector element $131_1$, subscriber terminal $110_2$ terminates on protector element $131_2$, subscriber terminal $110_3$ terminates on protector element $131_3$, and subscriber terminal $110_N$ terminates on protector element $131_P$. The equipment elements 139 are connected to TDM Switch 150 via office line side equipment cable pairs 140, thereby providing connectivity between equipment elements 139 and TDM switch 150. The jumper wires 135 provide connectivity between protector elements 131 and equipment elements 139. It will be appreciated that MDF 130 may include fewer or more protector elements 131, fewer or more equipment elements 139, and fewer or more jumper wires 135, and that these components may be configured in various other ways. The TDM switch 150 is configured to serve the MDF 130 and, thus, the subscriber terminals 110 connected to the MDF 130 via the subscriber cable pairs 120. The TDM switch 150 may operate as a gateway for communication between MDF 130 and other equipment upstream of TDM switch 150 (via which telephone calls between subscriber terminals 110 and other endpoints (omitted for purposes of clarity) may be propagated).

The TDM switch 150 includes a dedicated POTS port 151 configured to support POTS-based access to TDM switch 150. The POTS port 151 is configured to support Caller ID and call screening features, which are provisioned to allow discovery of telephone numbers associated with POTS-based subscriber cable pairs 120 (discussed in additional detail below).

The TDM switch 150 includes an Office Maintenance Terminal (OMT) port 152 configured to support a Local Area Network (LAN) connection to the TDM switch 150. The OMT port 152 is configured to support input of control commands at the Command Line Interface (CLI) level.

The TDM switch 150 includes metallic test unit (MTU) circuitry 153 configured to provide a test position(s) 154 configured for use in testing a set of subscriber line ports 155. The test position(s) 154 is available through the MTU circuitry 153. A test position 154 may be used to perform foreign voltage, resistance, and capacitance checks on a given subscriber cable pair 120 (e.g., under control of the subscriber cable pair identification assembly 160). A test position 154 may be controlled using one or more command line inputs via OMT port 152. A subscriber line port 155 has two sides as follows: (1) the external side (also commonly referred to as the customer loop side as it is the side of the subscriber line port 155 facing out to the customer site via the customer loop) and (2) the internal side (also commonly referred to as the switched network side) which provides necessary capabilities (e.g., hardware and software) for the subscriber line to function. The subscriber line ports 155 may include POTS subscriber line ports providing POTS services to POTS-based subscriber terminals 110, ISDN subscriber line ports providing ISDN services to ISDN-based subscriber terminals 110, or a combination thereof. A subscriber line port 155 may be tested by seizing the subscriber line port 155. A subscriber line port 155 may be seized by seizing, via the MTU circuitry 153 (which, as noted above, may be seized using one or more command line inputs via OMT port 152), a test position 154 that is configured to provide access to the subscriber line port 155. The seizing of a subscriber line port 155 causes the subscriber line port 155 to be placed out of service and, thus, responsive to a command to seize a subscriber line port 155 but prior to actually seizing the subscriber line port 155, a determination may be made as to whether the subscriber line port 155 is busy or idle. If the subscriber line port 155 is busy when a request to seize the subscriber line port 155 is received, TDM switch 150 reports the condition and does not seize the subscriber line port 155. If the subscriber line port 155 is idle when a request to seize the subscriber line port 155 is received, the subscriber line port 155 is seized, thereby ensuring that the associated subscriber cable pair 120 is out of service and available for testing. A subscriber line port 155 may be tested (e.g., foreign voltage tests, resistance tests, capacitance tests, or the like, as well as various combinations thereof) using one or more command line inputs via OMT port 152. A subscriber line port 155 remains seized until released via one or more command line inputs via OMT port 152. A test position 154 remains seized until released via one or more command line inputs via OMT port 152.

The TDM switch 150 may include any suitable type of TDM switch which may be configured to support POTS service, ISDN service, or the like, as well as various combinations thereof. For example, TDM switch 150 may be an Electronic World Switch Digital (EWSD) or other suitable type of switch. It will be appreciated that the switch type of TDM switch 150 will determine the correct 48V orientation relative to the wiring of the Tip and Ring leads on the subscriber cable pair 120 (e.g., EWSD switches are known to have a backward wiring of the Tip and Ring leads relative to the normal accepted practice of wiring the −48V potential on the Ring lead; namely, the EWSD line wires the −48V potential to the Tip lead).

It will be appreciated that, although primarily depicted and described herein with respect to use of a TDM switch to support subscriber cable pairs 120, any suitable type of switch may be used to support subscriber cable pairs 120 and, thus, any suitable type of switch may be use to support subscriber cable pair identification as depicted and described herein.

The subscriber cable pair identification assembly 160 is configured to support subscriber cable pair identification for both POTS subscriber cable pairs 120 and ISDN subscriber cable pairs 120. However, it will be appreciated that subscriber cable pair identification assembly 160 may be adapted to support subscriber cable pair identification for POTS subscriber cable pairs 120 only (e.g., by removing, or eliminating use of, elements that are used for ISDN subscriber cable pair identification) or may be adapted to support subscriber cable pair identification for ISDN subscriber cable pairs 120 only (e.g., by removing, or eliminating use of, elements that are used for POTS subscriber cable pair identification).

It will be appreciated that subscriber cable pair identification may be performed for various reasons.

For example, subscriber cable pair identification may be performed as part of a migration of an existing customer base of subscriber cable pairs within the context of next generation network (NGN) network replacements. It will be appreciated that the basic steps performed as part of the migration of the existing customer base of subscriber cable pairs within the context of NGN network replacements may depend on the integrity of the existing subscriber cable pair records. If the existing subscriber cable pair records are suspect or incomplete, subscriber cable pair identification may be used to verify or complete the subscriber cable pair records. For example, the basic steps performed as part of the migration of the existing customer base of subscriber cable pairs within the context of NGN network replacements when subscriber cable pair records are suspect or incomplete may include: (1) obtaining existing records of the subscriber cable pairs to be migrated (e.g., each line to be migrated, the associated telephone number, port (e.g., POTS or ISDN port), and MDF cable and pair assignment), (2) validating the existing records of the subscriber cable pairs to be migrated (e.g., using embodiments of subscriber cable pair identification to verify the relationships of the subscriber cable pairs to the telephone numbers/ports at the MDF, respectively), including correcting any records identified as being incorrect, to provide valid subscriber cable pair information (3) building a jumper list based on the valid subscriber cable pair information, (4) run jumpers from the existing subscriber cable pairs to the NGN ports on the NGN switch and validate the connections, and (5) perform the cutover. At this point, the subscriber lines would be in-service on the NGN switch (provided that the copper verification process completed successfully). It will be appreciated that, when using the above-described migration process (or a similar process), all or nearly all of the customer outage risk is removed during the migration period. It is noted that the above-described migration process is repeatable for most POTS/ISDN to NGN element replacements.

For example, subscriber cable pair identification may be performed periodically in order to proactively ensure the integrity of the subscriber cable pair records.

It will be appreciated that subscriber cable pair identification may be performed for various other reasons, and that the subscriber cable pair identification process is not necessarily dependent on the reason(s) for which subscriber cable pair identification may be performed.

The subscriber cable pair identification assembly 160 includes a computing device 161, a probe interface device 165, and a probe 169.

The computing device 161 is configured to control subscriber cable pair identification. The computing device 161 also may be configured to control various other functions which may be performed in conjunction with subscriber cable pair identification. The computing device 161 includes a pair of modems denoted as first modem $162_1$ and second modem $162_2$ (collectively, modems 162) for use in subscriber cable pair identification for POTS-based subscriber terminals 110. The computing device 161 includes a Universal Serial Bus (USB) interface 163 and a LAN interface 164 for use in subscriber cable pair identification for ISDN-based subscriber terminals 110. The computing device 161 also includes various other elements (e.g., a processor, a memory, and the like) which are omitted from FIG. 1 for purposes of clarity. For example, the computing device 161 may be a laptop computer, a desktop computer, a tablet computer, or the like. An exemplary embodiment of computing device 161 is depicted and described in FIG. 2.

The probe interface device 165 is configured as an interface between computing device 161 and probe 169.

The probe interface device 165 includes a modem connection 166 for use in subscriber cable pair identification for POTS-based subscriber terminals 110. The probe interface device 165 includes an RS-232 interface 167 for use in subscriber cable pair identification for POTS-based subscriber cable pairs 120 and ISDN-based subscriber cable pairs 120. The RS-232 interface 167 operates under the control of computing device 161. The probe interface device 165 includes a probe port 168 configured to support connection of probe 169 to probe interface device 165. An exemplary embodiment of the probe interface device 165 is depicted and described in FIG. 3.

The probe 169 includes a connector portion 169$_{CON}$ configured to interface with terminals of MDF 130 and a cable portion 169$_{CAB}$ configured to connect probe 169 to probe interface device 165. The typical configuration of a probe configured to interface with terminals of an MDF will be understood by one skilled in the art.

The subscriber cable pair identification assembly 160 is configured to support subscriber cable pair identification for POTS-based subscriber cable pairs 120 and ISDN-based subscriber cable pairs 120. As depicted in FIG. 1, computing device 161 is configured to support a first POTS connection 171 between the first modem 162$_1$ of computing device 161 and the modem connection 166 of probe interface device 165 and a second POTS connection 172 between the second modem 162$_2$ of computing device 161 and the POTS port 151 of TDM switch 150. It will be appreciated that, although second POTS connection 172 between the second modem 162$_2$ of computing device 161 and the POTS port 151 of TDM switch 150 is depicted as being a direct connection, the connection between the second modem 162$_2$ of computing device 161 and the POTS port 151 of TDM switch 150 may be connected via MDF 130. As further depicted in FIG. 1, computing device 161 is configured to support a USB-RS232 connection 181 between the USB interface 163 of computing device 161 and the RS-232 interface 167 of probe interface device 165 and a LAN connection 182 between the LAN interface 164 of computing device 161 and the OMT port 152 of TDM switch 150.

The subscriber cable pair identification assembly 160 is configured to support subscriber cable pair identification for POTS-based subscriber cable pairs 120. The subscriber cable pair identification assembly 160 is configured to identify working subscriber cable pairs 120 at the MDF 130 for assigned POTS lines. The subscriber cable pair identification assembly 160 is configured to support switch-based (e.g., via TDM switch 150) identification of POTS-based subscriber cable pairs 120. The subscriber cable pair identification assembly 160, for a given POTS-based subscriber cable pair 120, is configured to validate an association between the POTS-based subscriber cable pair 120, a telephone number of the POTS-based subscriber cable pair 120, and a subscriber line port 155 serving the POTS-based subscriber cable pair 120. For POTS service, it is assumed that associations between subscriber line ports 155 and telephone numbers on the TDM switch 150 (referred to as expected telephone numbers) are known and available as input information (e.g., from the TDM switch database of the TDM switch 150 itself and/or from one or more support systems). The subscriber cable pair identification assembly 160, for a given POTS-based subscriber cable pair 120, may be configured to validate an association between the POTS-based subscriber cable pair 120 and an expected telephone number of the POTS-based subscriber cable pair 120 (and, thus, also the subscriber line port 155 and, therefore, the wired path between the POTS-based subscriber cable pair 120 connected to the MDF 130 and the subscriber line port 155 on TDM switch 150 that is associated with the POTS-based subscriber cable pair 120) by discovering a telephone number associated with the POTS-based subscriber cable pair 120 and comparing the discovered telephone number with the expected telephone number of the POTS-based subscriber cable pair 120. As depicted in FIG. 1, subscriber cable pair identification for POTS-based subscriber cable pairs 120 may be performed using the first POTS connection 171 between the first modem 162$_1$ of computing device 161 and the modem connection 166 of probe interface device 165, the second POTS connection 172 between the second modem 162$_2$ of computing device 161 and the POTS port 151 of TDM switch 150, and USB-RS232 connection 181 between the USB interface 163 of computing device 161 and the RS-232 interface 167 of probe interface device 165 (which is used by computing device 161 to control circuitry of the probe interface device 165 for performing various functions associated with identification of POTS-based subscriber cable pairs 120). The computing device 161 of subscriber cable pair identification assembly 160 is configured to control subscriber cable pair identification for POTS cable pairs.

The subscriber cable pair identification assembly 160 is configured to support subscriber cable pair identification for ISDN-based subscriber cable pairs 120. The subscriber cable pair identification assembly 160 is configured to identify working subscriber cable pairs 120 at the MDF 130 for assigned ISDN lines. The subscriber cable pair identification assembly 160 is configured to support switch-based (e.g., via TDM switch 150) identification of ISDN-based subscriber cable pairs 120.

The subscriber cable pair identification assembly 160, for a given ISDN-based subscriber cable pair 120, is configured to validate an association between the ISDN-based subscriber cable pair 120, a telephone number of the ISDN-based subscriber cable pair 120, and a subscriber line port 155 serving the ISDN-based subscriber cable pair 120. The association between the ISDN-based subscriber cable pair 120, the telephone number of the ISDN-based subscriber cable pair 120, and the subscriber line port 155 serving the ISDN-based subscriber cable pair 120 is obtained as an input for use in validating the association. For ISDN service, it is assumed that associations between subscriber line ports 155 and telephone numbers on the TDM switch 150 are known and available as input information (e.g., from the TDM switch database of the TDM switch 150 itself and/or from one or more support systems). For ISDN service, the subscriber cable pair information is typically not available from the TDM switch 150, but may be obtained from one or more support system databases. The association between the ISDN-based subscriber cable pair 120, the telephone number of the ISDN-based subscriber cable pair 120, and the subscriber line port 155 serving the ISDN-based subscriber cable pair 120 may then be constructed for use an input for use in validating the association. The subscriber cable pair identification assembly 160, for a given ISDN-based subscriber cable pair 120, may be configured to validate an association between the ISDN-based subscriber cable pair 120 and the subscriber line port 155 of the ISDN-based subscriber cable pair 120 (and, thus, also the telephone number associated with the subscriber line port 155 and the ISDN-based subscriber cable pair 120) by performing one or more resistance checks on the subscriber line port 155 via the test position 154 associated with the subscriber line port 155. The subscriber cable pair identification for ISDN cable pairs may be performed using the USB-RS232 connection 181 between the USB interface 163 of computing device 161 and the RS-232 interface 167 of probe interface device 165 (which is used by computing device 161 to control circuitry of the probe interface device 165 for performing various functions associated with identification of ISDN-based subscriber cable pairs 120) and the LAN connection 182 between the LAN interface 164 of computing device 161 and the OMT port 152 of TDM switch 150. The computing device 161 of subscriber cable pair identification assembly 160 is configured to control subscriber cable pair identification for ISDN cable pairs.

The configuration of subscriber cable pair identification assembly 160 in supporting subscriber cable pair identification functions for POTS-based subscriber cable pairs 120 and ISDN-based subscriber cable pairs 120 may be better understood by way of reference to FIGS. 2-7.

Figure 2:
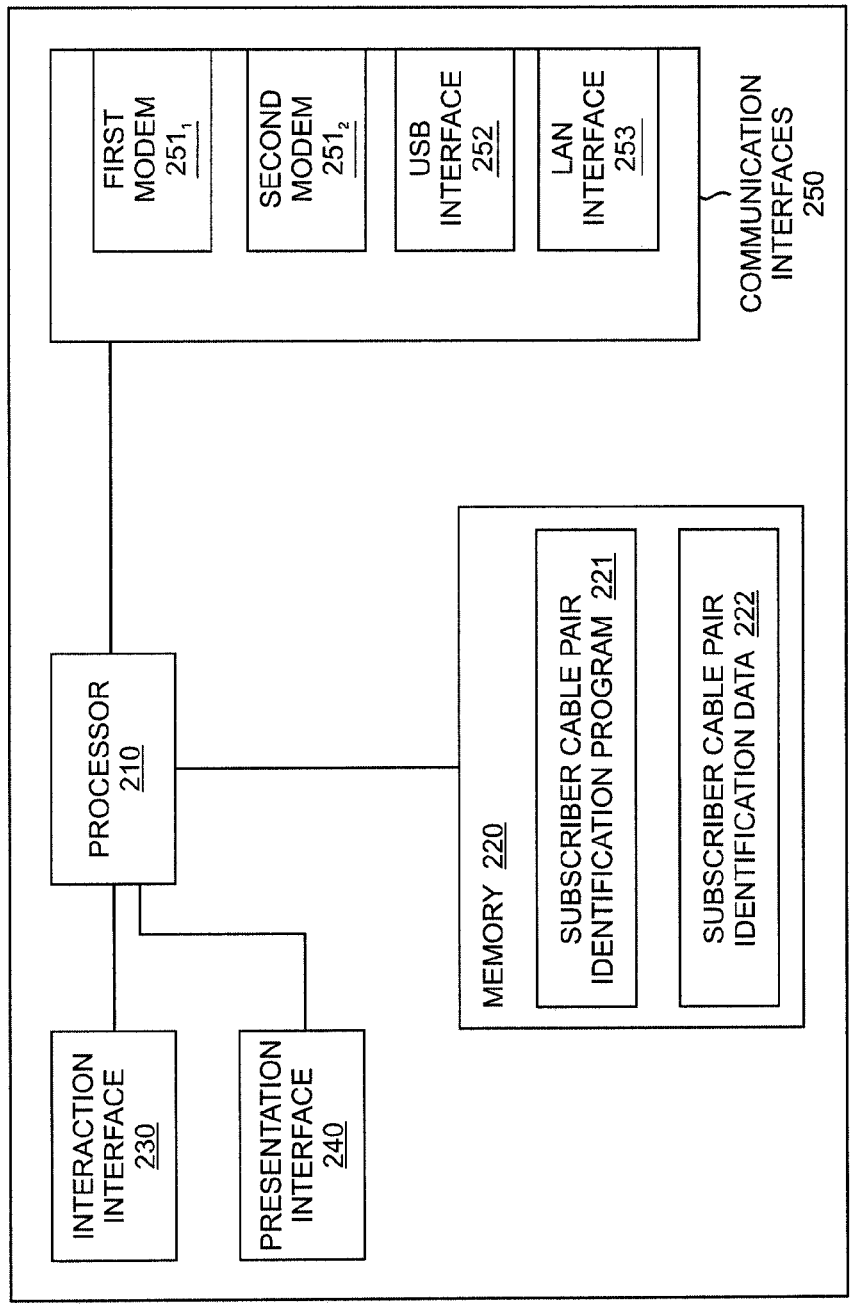
FIG. 2 depicts an exemplary computing device for the subscriber cable pair identification assembly of FIG. 1.

FIG. 2 depicts an exemplary computing device for the subscriber cable pair identification assembly of FIG. 1. The exemplary computing device 200 of FIG. 2 is suitable for use as computing device 161 of the subscriber cable pair identification assembly 160 of FIG. 1.

As depicted in FIG. 2, the exemplary computing device 200 of FIG. 2 includes a processor 210, a memory 220, an interaction interface 230, a presentation interface 240, and a set of communication interfaces 250. The memory 220, interaction interface 230, presentation interface 240, and communication interfaces 250 each are communicatively connected to processor 210.

The processor 210 is configured to control subscriber cable pair identification functions performed by computing device 200.

The memory 220 stores a subscriber cable pair identification program 221 and subscriber cable pair identification data 222.

The subscriber cable pair identification program 221 is configured to support subscriber cable pair identification for both POTS cable pairs and ISDN cable pairs. The subscriber cable pair identification program 221 is configured to read from subscriber cable pair identification data 222 for purposes of performing subscriber cable pair identification and is configured to write to subscriber cable pair identification data 222 for purposes of recording results of performing subscriber cable pair identification. The subscriber cable pair identification program 221 may be written in Visual Basic, C++, or using any other suitable programming language(s). The processor 210 is configured to retrieve the subscriber cable pair identification program 221 from the memory 220 and to execute the subscriber cable pair identification program 221 for providing various subscriber cable pair identification functions presented herein.

The subscriber cable pair identification data 222 may include any data which may be used as input for subscriber cable pair identification or which may be output as a result of subscriber cable pair identification. For example, the subscriber cable pair identification data 222 may include a spreadsheet including various data field including data for each subscriber cable pair 120. For example, the data fields (which may not all be populated for all subscriber cable pair 120, depending, e.g., on whether the subscriber cable pair 120 is a POTS-based cable pair or an ISDN-based cable pair) may include a cable number field, a cable pair number field, a telephone number expected field (e.g., including the telephone number expected to be associated with that subscriber cable pair 120 based on existing mapping records), a telephone number discovered field (e.g., including the telephone number identified as being associated with that subscriber cable pair 120 based on execution by the computing device 200 of the subscriber cable pair identification process), an exchange field, a service type field (e.g., denoting either POTS service or ISDN service), a test status field, or the like, as well as various combinations thereof. The subscriber cable pair identification data 222 may include any other suitable input or output data associated with subscriber cable pair identification performed by computing device 200. An exemplary spreadsheet is depicted and described in FIG. 9.

The interaction interface 230 may include any suitable interface or interfaces (e.g., a keyboard, a mouse, a touchpad, a touch screen, a television remote, or the like, as well as various combinations thereof) via which a user may control computing device 200 (e.g., initiating subscriber cable pair identification for a subscriber cable pair 120, accessing results of subscriber cable pair identification for a subscriber cable pair 120, or the like). The presentation interface 240 may include any suitable interface or interfaces (e.g., a screen of a smartphone or tablet, a computer monitor, or the like, as well as various combinations thereof) for presenting information (e.g., subscriber cable pair identification data 222). It will be appreciated that, although interaction interface 230 and presentation interface 240 are depicted and described as separate interfaces, at least some portions of interaction interface 230 and presentation interface 240 may be integrated in various types of computing devices.

The set of communication interfaces 250 includes a pair of modems denoted as first modem $251_1$ and a second modem $251_2$ (collectively, modems 251), a USB interface 252, and a LAN interface 253. The processor 210 is configured to control the communication interfaces 250 (under control of subscriber cable pair identification program 221) for performing subscriber cable pair identification functions.

The modems 251 (which correspond to modems 162 of FIG. 1) are used to perform subscriber cable pair identification for POTS-based subscriber cable pairs 120. The computing device 200, under program control (e.g., subscriber cable pair identification program 221 which may be executed by processor 210), is configured to perform subscriber cable pair identification for POTS-based subscriber cable pairs 120. The first modem $251_1$ is used to check for dial tone through probe interface device 165 and probe 169, and to place a call to second modem $252_2$. The second modem $252_2$ is assigned to a fixed line and is assigned the Caller ID feature. The computing device 200, when the call attempts to terminate to the second modem $252_2$ via a ringing cycle to second modem $252_2$, captures the Caller ID data (which includes the telephone number of the originating port, which in this case, is placed by first modem $251_1$ through the probe interface device 165), thereby determining the associated telephone number for the subscriber cable pair 120 currently under test. The call does not necessarily have to complete to the second modem; rather, the call may be abandoned as soon as the Caller ID data is received (e.g., between the first ring and the second ring). The Caller ID feature and the call screening are provisioned to allow outgoing calls from the first modem $251_1$ to reach and be displayed at the second modem $252_2$. The computing device 200 may be configured to provide various other functions in support of subscriber cable pair identification for POTS-based subscriber cable pairs 120, as discussed further below.

The USB interface 252 (which corresponds to USB interface 163 of FIG. 1) is used to perform subscriber cable pair identification for POTS-based subscriber cable pairs 120 and ISDN-based subscriber cable pairs 120. The USB interface 252 is used by computing device 200 to control probe interface device 165 for use in performing subscriber cable pair identification for POTS-based subscriber cable pairs 120 and ISDN-based subscriber cable pairs 120.

The LAN interface 253 (which corresponds to LAN interface 164 of FIG. 1) is used to perform subscriber cable pair identification for ISDN-based subscriber cable pairs 120. The LAN interface 253 provides an interface from computing device 200 to the OMT port 152 of TDM switch 150, thereby enabling the computing device 200 to seize the a test position 154 (e.g., via use of CLI level commands) on the TDM switch 150 and perform subscriber cable pair identification on ISDN-based subscriber cable pairs 120 associated with the test position 154. The computing device 200, under program control (e.g., subscriber cable pair identification program 221 which may be executed by processor 210), is configured to perform subscriber cable pair identification for ISDN-based subscriber cable pairs 120. The computing device 220 may or may not be configured to determine whether the subscriber cable pair 120 under test is an ISDN-based subscriber cable pair 120 (e.g., this may not be necessary where all subscriber cable pairs are known to be, or can reasonably be assumed to be, ISDN-based subscriber cable pairs 120). In at least some embodiments, computing device 200, in order to perform subscriber cable pair identification for an ISDN-based subscriber cable pair 120, may be configured to: (1) under program control, seize a test position 154 on the TDM switch 150, (2) check busy/idle status for the ISDN-based subscriber cable pair 120 (e.g., responsive to a request to seize a subscriber line port 155 associated with the ISDN-based subscriber cable pair 120), (3) based on a determination that the ISDN-based subscriber cable pair 120 is in a busy state, mark the ISDN-based subscriber cable pair 120 as being busy (e.g., "BUSY") and end the test, (4) based on a determination that the ISDN-based subscriber cable pair 120 is in an idle state, seize the subscriber line port 155 through the test position 154 on the TDM switch 150 and execute a cable loop resistance check for the ISDN-based subscriber cable pair 120 via the test position 154 on the TDM switch 150, (5) based on a determination that the resistance of the ISDN subscriber cable pair 120 is less than an expected value (e.g., typically 200K or more, although other suitable values may be used), mark the ISDN-based subscriber cable pair 120 as having low resistance (e.g., "LRES") and end the test, (6) based on a determination that the resistance of the cable loop is greater than an expected value (e.g., typically 200K or more, although other suitable values may be used) apply a resistance element of the probe interface device 165 (e.g., a 22K resistor or other suitable resistance element having any suitable amount of resistance) across the probe (and, thus, across the ISDN-based subscriber cable pair 120 when the probe 169 is connected to the ISDN-based subscriber cable pair 120), (7) execute a cable loop resistance check for the ISDN-based subscriber cable pair 120 via the test position 154 on the TDM switch 150, (8) based on a determination that the resistance element is detected at the test position 154 on the TDM switch 150, mark the ISDN-based subscriber cable pair 120 as being in a pass state and end the test (including releasing the resistance element, releasing control of the subscriber line port 155 associated with the ISDN subscriber cable pair 120 under test from the test position 154, and, optionally, releasing the test position 154 if the test position 154 is no longer needed), and (9) based on a determination that the resistance element is not detected by the test position, mark the ISDN-based subscriber cable pair 120 as being as being in a fail state and end the test (again, including releasing the resistance element, releasing control of the subscriber line port 155 associated with the ISDN subscriber cable pair 120 under test from the test position 154, and, optionally, releasing the test position 154 if the test position 154 is no longer needed). The computing device 200 may be configured to provide various other functions in support of subscriber cable pair identification for ISDN-based subscriber cable pairs 120, as discussed further below.

It will be appreciated that computing device 200 of FIG. 2 is only exemplary, and that other computing devices may be used to provide the various subscriber cable pair identification functions presented herein.

Figure 3:
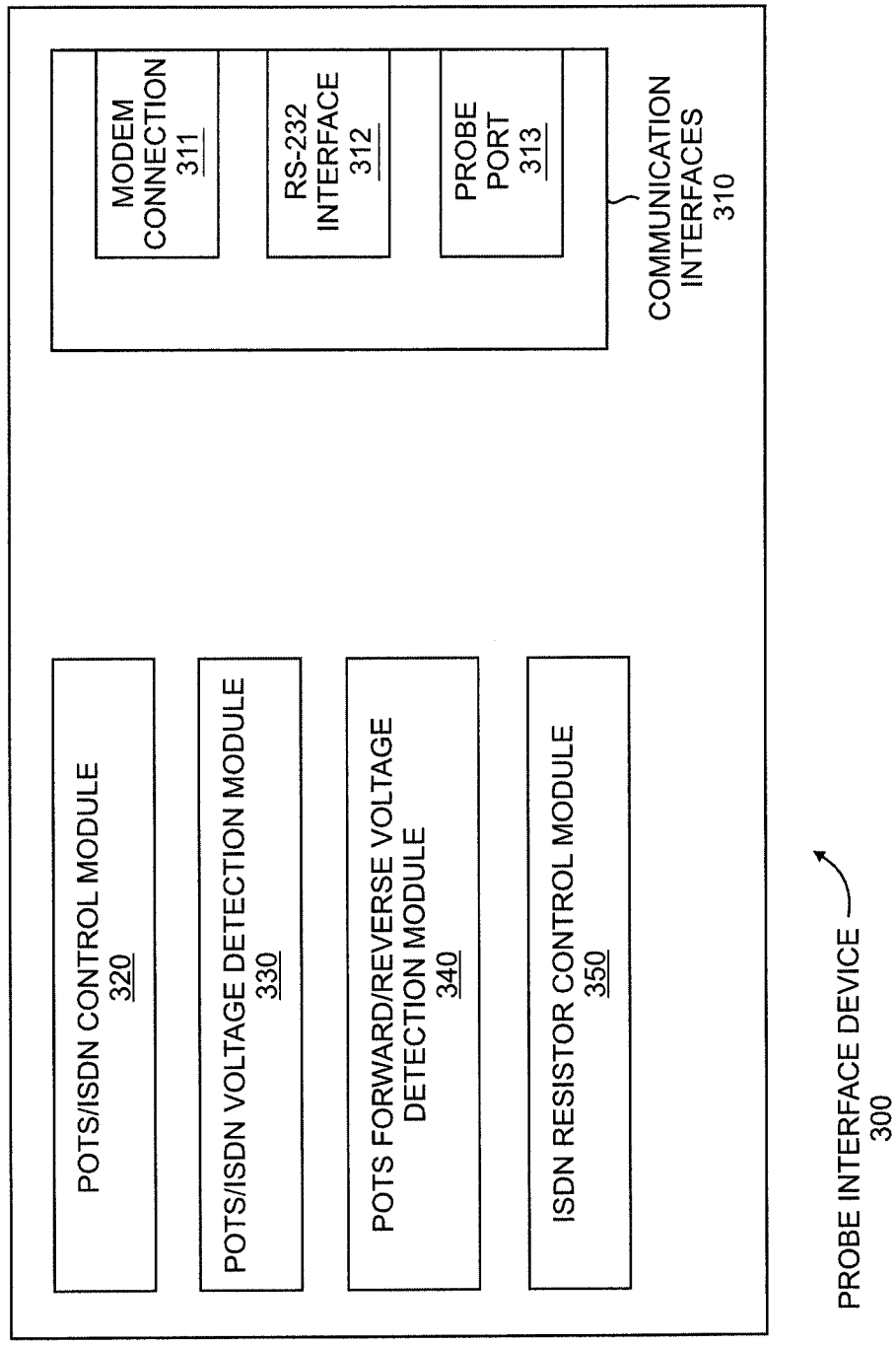
FIG. 3 depicts an exemplary probe interface device for the subscriber cable pair identification assembly of FIG. 1.

FIG. 3 depicts an exemplary probe interface device for the subscriber cable pair identification assembly of FIG. 1. The exemplary probe interface device 300 of FIG. 3 is suitable for use as probe interface device 165 of the subscriber cable pair identification assembly 160 of FIG. 1.

As depicted in FIG. 3, the exemplary probe interface device 300 of FIG. 3 includes a set of communication interfaces 310, a POTS/ISDN control module 320, a POTS/ISDN voltage detection module 330, a POTS forward/reverse voltage detection module 340, and an ISDN resistor control module 350. It will be appreciated that, although omitted for purposes of clarity, the probe interface device 300 may include various other elements, such as other elements (e.g., power circuitry), circuitry interconnecting the various modules, circuitry interconnecting the various modules and interfaces, or the like, as well as various combinations thereof.

The set of communication interfaces 310 includes a modem connection 311, an RS-232 interface 312, and a probe port 313.

The modem connection 311 (which corresponds to modem connection 166 of FIG. 1 that connects first modem $162_1$ of computing device 161 to probe interface device 165) is used to perform subscriber cable pair identification for POTS-based subscriber cable pairs 120.

The RS-232 interface 312 (which corresponds to RS-232 interface 167 of FIG. 1) is used to control the probe interface device 165 to perform subscriber cable pair identification for POTS-based subscriber cable pairs 120 and ISDN-based subscriber cable pairs 120. The RS-232 interface 312 includes nine pins, which are described below in Table 1.

TABLE 1

| PIN | SIGNAL | IN/OUT | DESCRIPTION |
| --- | --- | --- | --- |
| 1 | DCD | IN | Data Carrier Detect |
| 2 | RxD | IN | Receive Data |
| 3 | TxD | OUT | Transmit Data |
| 4 | DTR | OUT | Data Terminal Ready |
| 5 | GND | — | Ground |
| 6 | DSR | IN | Data Set Ready |
| 7 | RTS | OUT | Request To Send |
| 8 | CTS | IN | Clear To Send |
| 9 | RI | IN | Ring Indicator |

For RS-232 interface 312, the "IN" and "OUT" indicators denote leads that are used to read and drive the connections to the probe interface device 300 and are part of the controls of computing device 161. It will be appreciated that typical DC operating voltage for the RS-232 leads is approximately 5-9 volts. The "IN" leads of RS-232 interface 312 are read by computing device 161 and the "OUT" leads of RS-232 interface 312 are used by computing device 161 to activate elements (e.g. POTS/ISDN control module 320, POTS/ISDN voltage detection module 330, POTS forward/reverse voltage detection module 340, ISDN resistor control module 350, or the like).

The probe port 313 (corresponding to probe port 168 of FIG. 1) is configured to support connection of probe 169 to the probe interface device 300.

Figure 4:
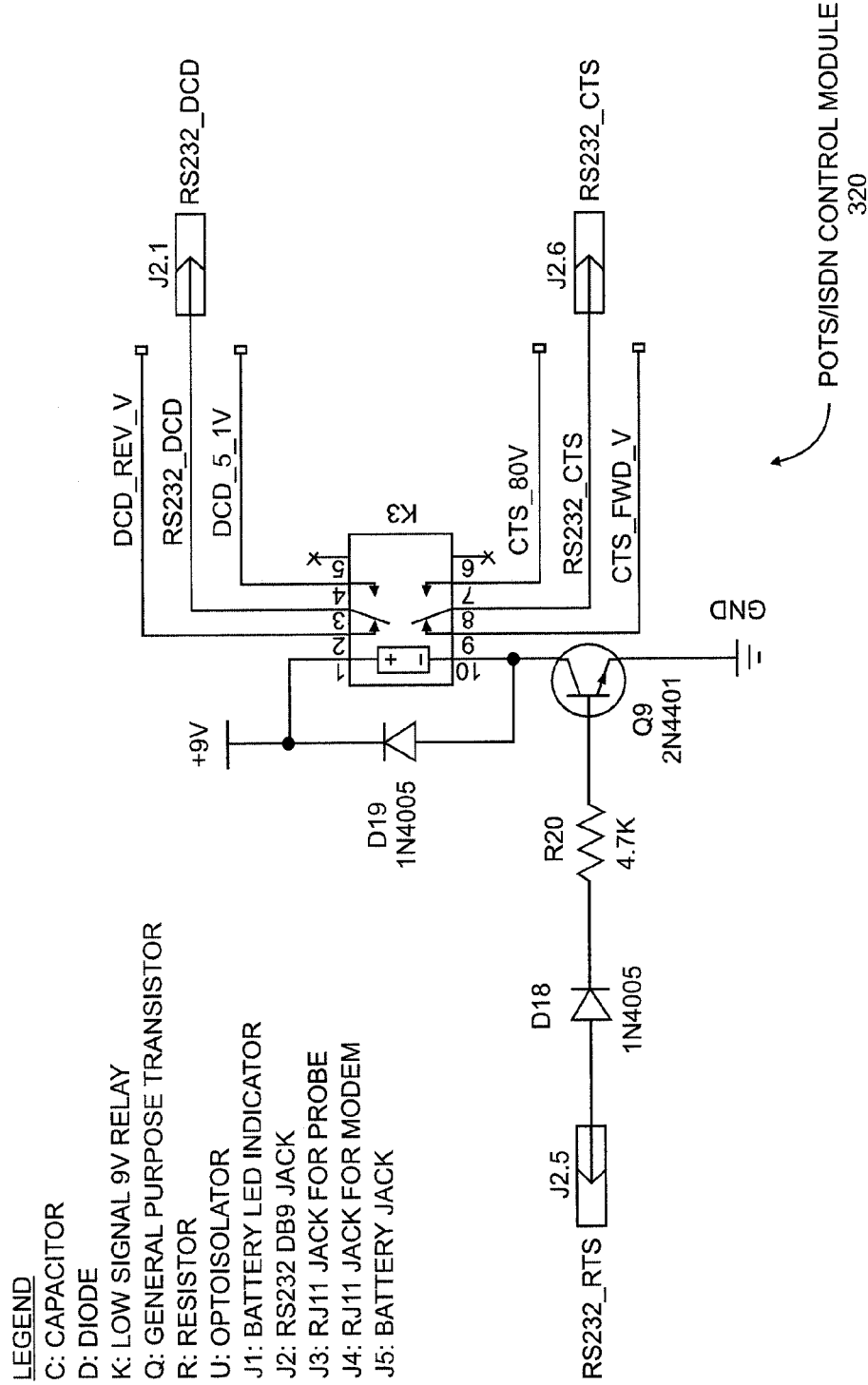
FIG. 4 depicts an exemplary POTS/ISDN control module for the exemplary probe interface device of FIG. 3.
Figure 5:
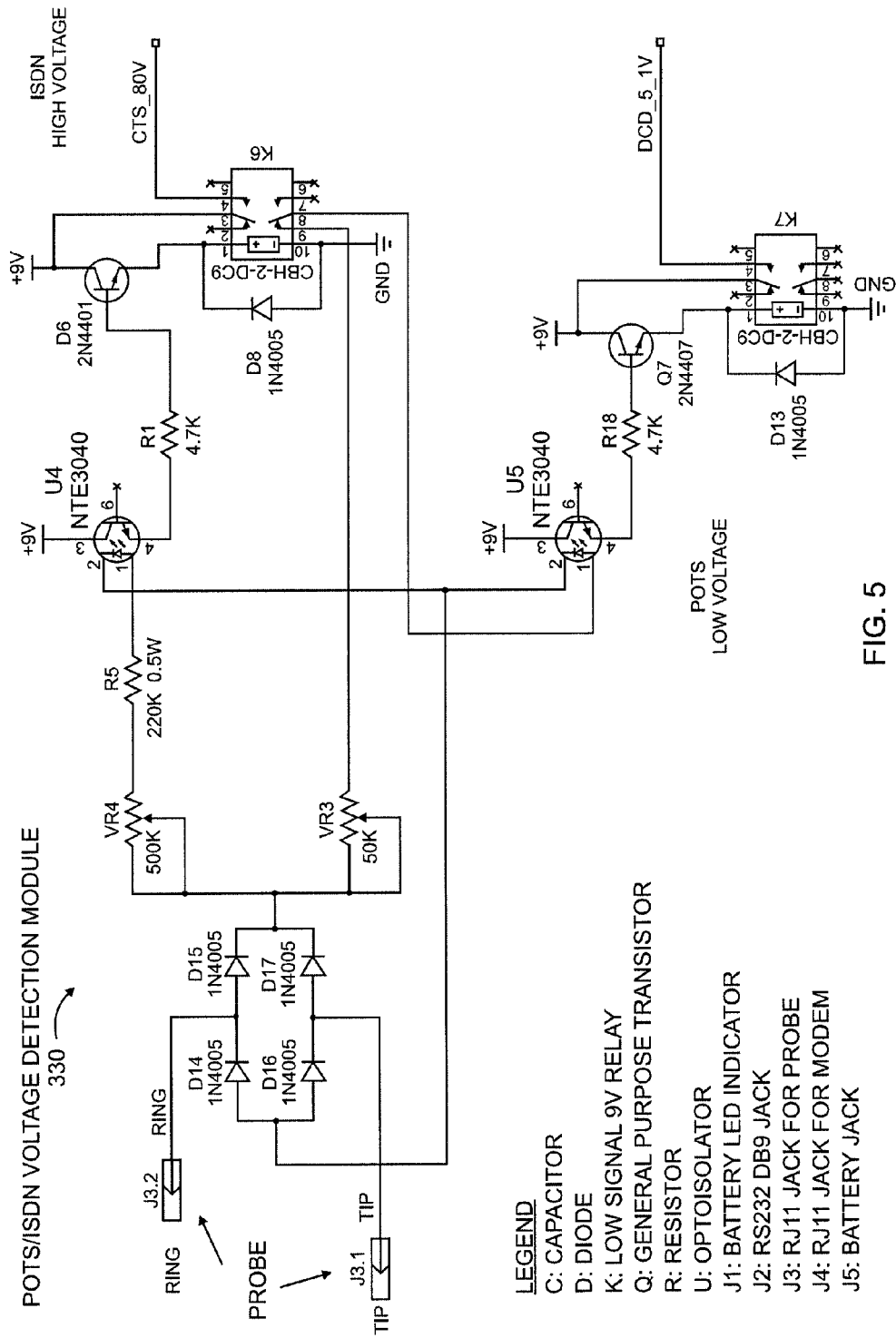
FIG. 5 depicts an exemplary POTS/ISDN voltage detection module for the exemplary probe interface device of FIG. 3.
Figure 6:
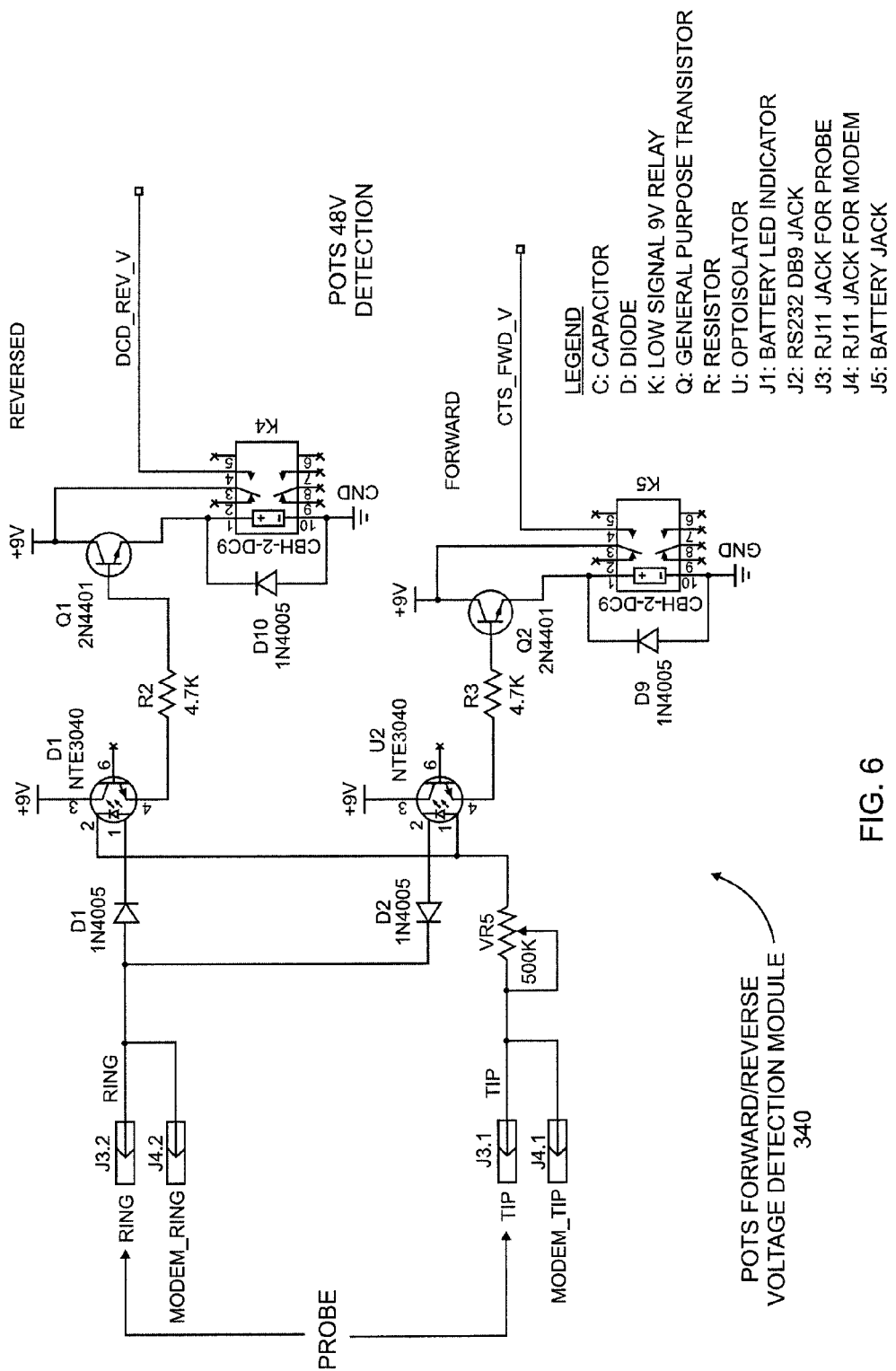
FIG. 6 depicts an exemplary POTS forward/reverse voltage detection module for the exemplary probe interface device of FIG. 3.

The POTS/ISDN control module 320 is configured to control use of POTS/ISDN voltage detection module 330 and the POTS forward/reverse voltage detection module 340 for subscriber cable pair identification of subscriber cable pairs 120. An exemplary POTS/ISDN control module 320 is depicted in FIG. 4. The computing device 161 controls application of a voltage (e.g., 5V or any other suitable voltage) to the "RTS"

lead in order to trigger the K3 relay and enable the reading of the leads wired to the ISDN High Voltage Circuit (CTS_80V) of POTS/ISDN voltage detection module 330 and to the POTS Low Voltage Circuit (DCD_5) of POTS/ISDN voltage detection module 330 (both of which are depicted in FIG. 5). If the computing device 161 detects that the POTS Low Voltage indicator is present, the computing device 161 (1) stores the POTS Low Voltage indicator in order to set a possible BUSY state for the POTS-based subscriber cable pair 120 currently under test and then (2) applies 0V to the "RTS" lead in order to read the leads wired to the POTS forward/reverse voltage detection module 340 (illustratively, DCD_REV and CTS_FWD which are depicted in FIG. 6). If the computing device 161 detects that the ISDN High Voltage is set high (thereby indicating that the subscriber cable pair 120 currently under test is supporting ISDN service), the computing device 161 initiates an ISDN test process (described in detail below) for testing the ISDN-based subscriber cable pair 120 currently under test. It will be appreciated that POTS/ISDN control module 320 may be implemented in various other ways (e.g., using circuit components having other values, using other types or arrangements of circuit components, or the like, as well as various combinations thereof) while still providing the various functions presented herein as being performed by POTS/ISDN control module 320.

The POTS/ISDN voltage detection module 330 is configured to sense voltage of a subscriber cable pair 120 in order to determine whether the subscriber cable pair 120 supports POTS service or ISDN service. It will be appreciated that typical POTS and ISDN voltages are 48V and 80V across the tip and ring leads of the probe 169, respectively. The POTS/ISDN voltage detection module 330 is configured to sense 5V potential and 80V potential and to determine the type of service supported by the subscriber cable pair 120 currently under test (namely, 80V or −80V indicates ISDN service). An exemplary POTS/ISDN voltage detection module 330 is depicted in FIG. 5. The exemplary POTS/ISDN voltage detection module 330 illustrates the connector portion $169_{CON}$ of probe 169. As previously discussed, the probe 169 may be used for testing of both POTS-based subscriber cable pairs 120 and ISDN-based subscriber cable pairs 120. As depicted in FIG. 5, the diode bridge circuit in front of the optoisolators is used to depolarize the incoming voltage and, as a result, the input voltage to the optoisolators is negative and will trigger the driver transistors if the voltage meets the tuned potential. The POTS Low Voltage circuit is used to detect a 5V potential on POTS-based subscriber cable pairs. If the computing device 161 detects that the POTS Low Voltage is set high thereby indicating that the subscriber cable pair 120 currently under test is supporting POTS service, the computing device 161 initiates a POTS test process (described in detail below) for testing the POTS-based subscriber cable pair 120 currently under test. If the computing device 161 detects that the IDSN High Voltage is set high (e.g., ~80V-100V), thereby indicating that the subscriber cable pair 120 currently under test is supporting ISDN service, the computing device 161 initiates an ISDN test process (described in detail below) for testing the ISDN-based subscriber cable pair 120 currently under test. As depicted in FIG. 4, POTS/ISDN voltage detection module 330 is configured such that the POTS Low Voltage relay (K7) is disconnected if the ISDN High Voltage Relay (K6) is set high. It will be appreciated that the POTS/ISDN voltage detection module 330 may be implemented in various other ways (e.g., using circuit components having other values, using other types or arrangements of circuit components, or the like, as well as various combinations thereof) while still providing the various functions presented herein as being performed by POTS/ISDN voltage detection module 330.

The POTS forward/reverse voltage detection module 340 is configured to sense POTS reversal of a POTS-based subscriber cable pair 120 (in which the tip and ring leads are wired backwards) at MDF 130. An exemplary POTS forward/reverse voltage detection module 340 is depicted in FIG. 6. The exemplary POTS forward/reverse voltage detection module 340 illustrates the connector portion $169_{CON}$ of probe 169. As previously discussed, the probe 169 may be used for testing of both POTS-based subscriber cable pairs 120 and ISDN-based subscriber cable pairs 120. As depicted in FIG. 6, exemplary POTS forward/reverse voltage detection module 340 includes forward and reverse circuits configured to detect 48V for POTS-based subscriber cable pairs 120. Two diodes, which are positioned on the input side of the forward and reverse circuits, are polarity sensitive such that only one of the two circuits is able to trigger depending on the polarity of the connection. The optoisolators isolate the various modules of the probe interface device 300 from the subscriber cable pair 120 that is currently under test, thereby avoiding any corruption or customer service issues while the probe 169 is actively engaged. The driver transistors activate the 9V relays when a base voltage is detected from the optoisolator. The relays make/break contacts in order to signal the computing device 161 regarding the various possible voltage readings. If sufficient voltage is detected, the forward or reverse relay will operate, applying 9V to the "CTS" or "DCD" lead of the circuit, respectively. The computing device 161, based on a determination that forward or reverse battery is not detected by the POTS forward/reverse voltage detection module 340, refers to the previous low voltage reading of the POTS/ISDN voltage detection module 330 to determine a possible BUSY state for the POTS-based subscriber cable pair 120. If low voltage was detected by the POTS/ISDN voltage detection module 330, and 48V was not detected by the POTS forward/reverse voltage detection module 340, the subscriber cable pair 120 under test is marked as "busy" and the test is ended. If low voltage was not detected by the POTS/ISDN voltage detection module 330, and 48V was not detected by POTS forward/reverse voltage detection module 340, the subscriber cable pair 120 under test is marked as "open" and the test is ended. It will be appreciated that POTS forward/reverse voltage detection module 340 may be implemented in various other ways (e.g., using circuit components having other values, using other types or arrangements of circuit components, or the like, as well as various combinations thereof) while still providing the various functions presented herein as being performed by POTS forward/reverse voltage detection module 340.

Figure 7:
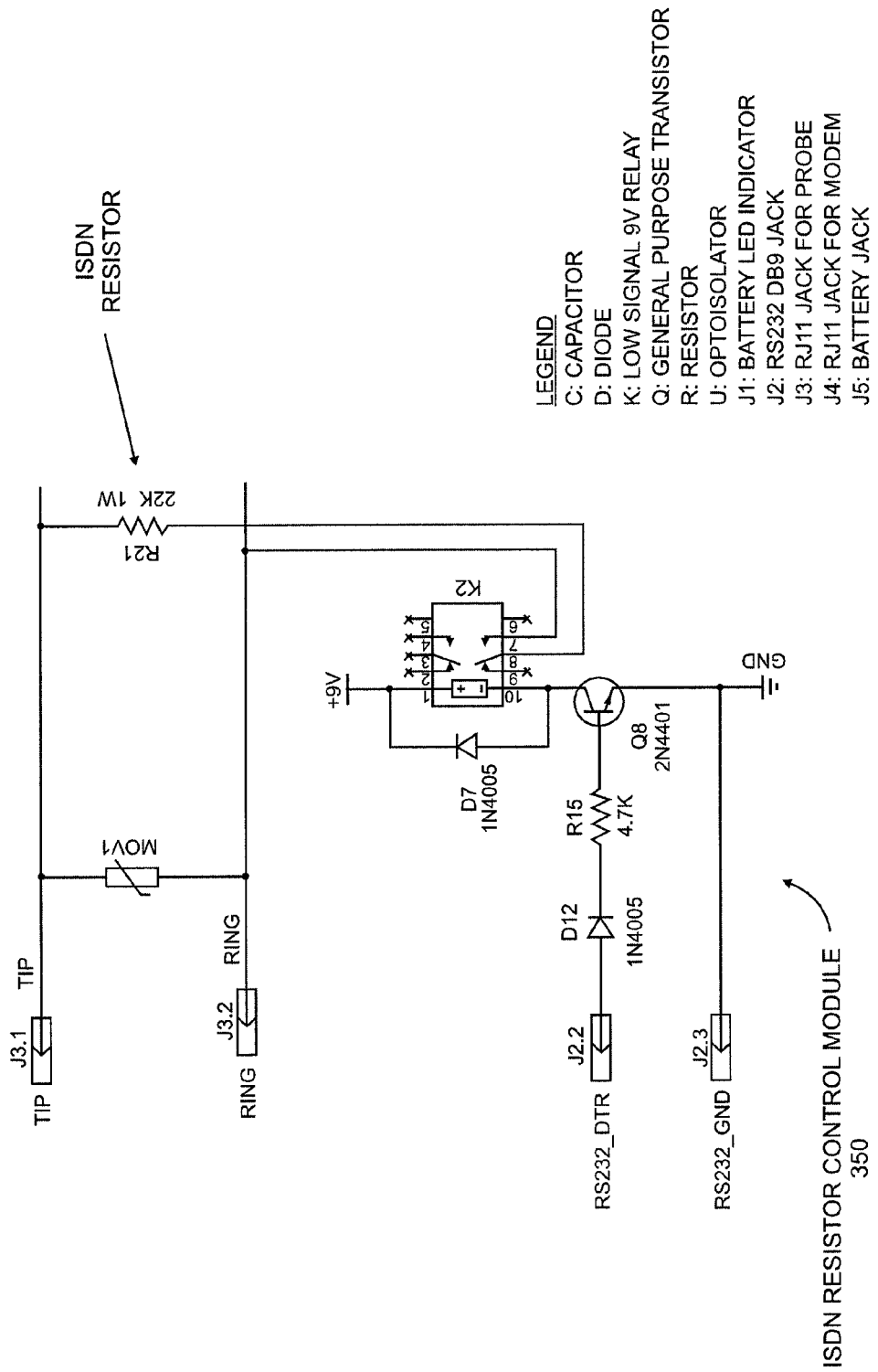
FIG. 7 depicts an exemplary ISDN resistor control module for the exemplary probe interface device of FIG. 3.
Figure 8A:
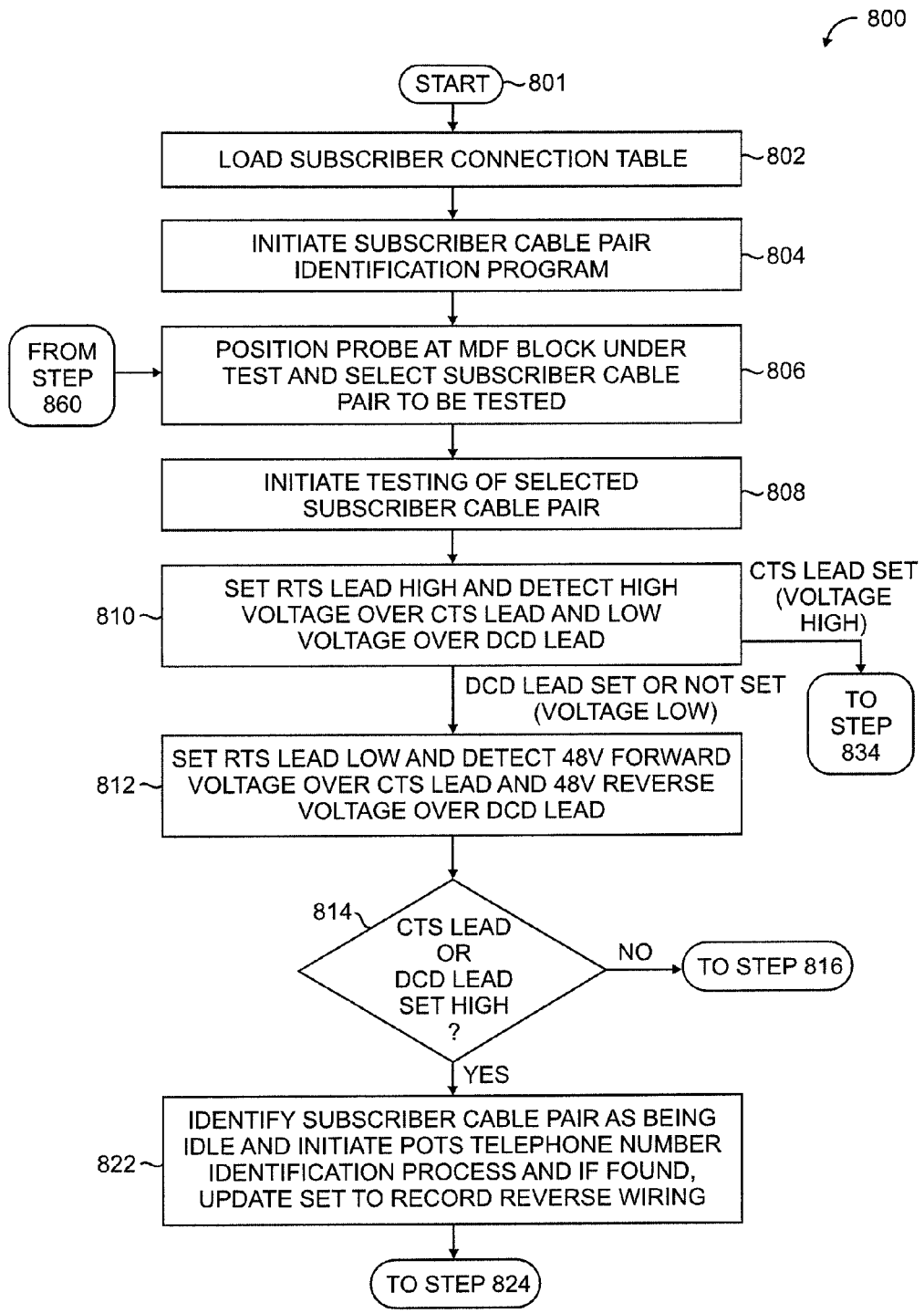
FIGS. 8A-8D depict an exemplary embodiment of a method for subscriber cable pair validation for a set of subscriber cable pairs.
Figure 8B:
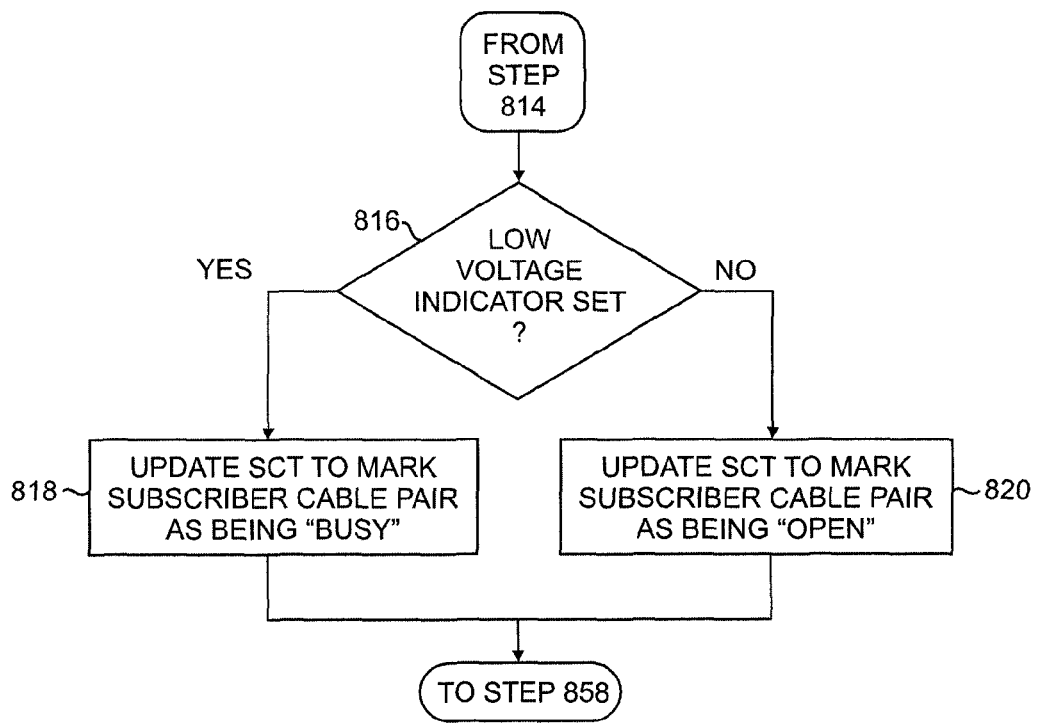
Figure 8C:
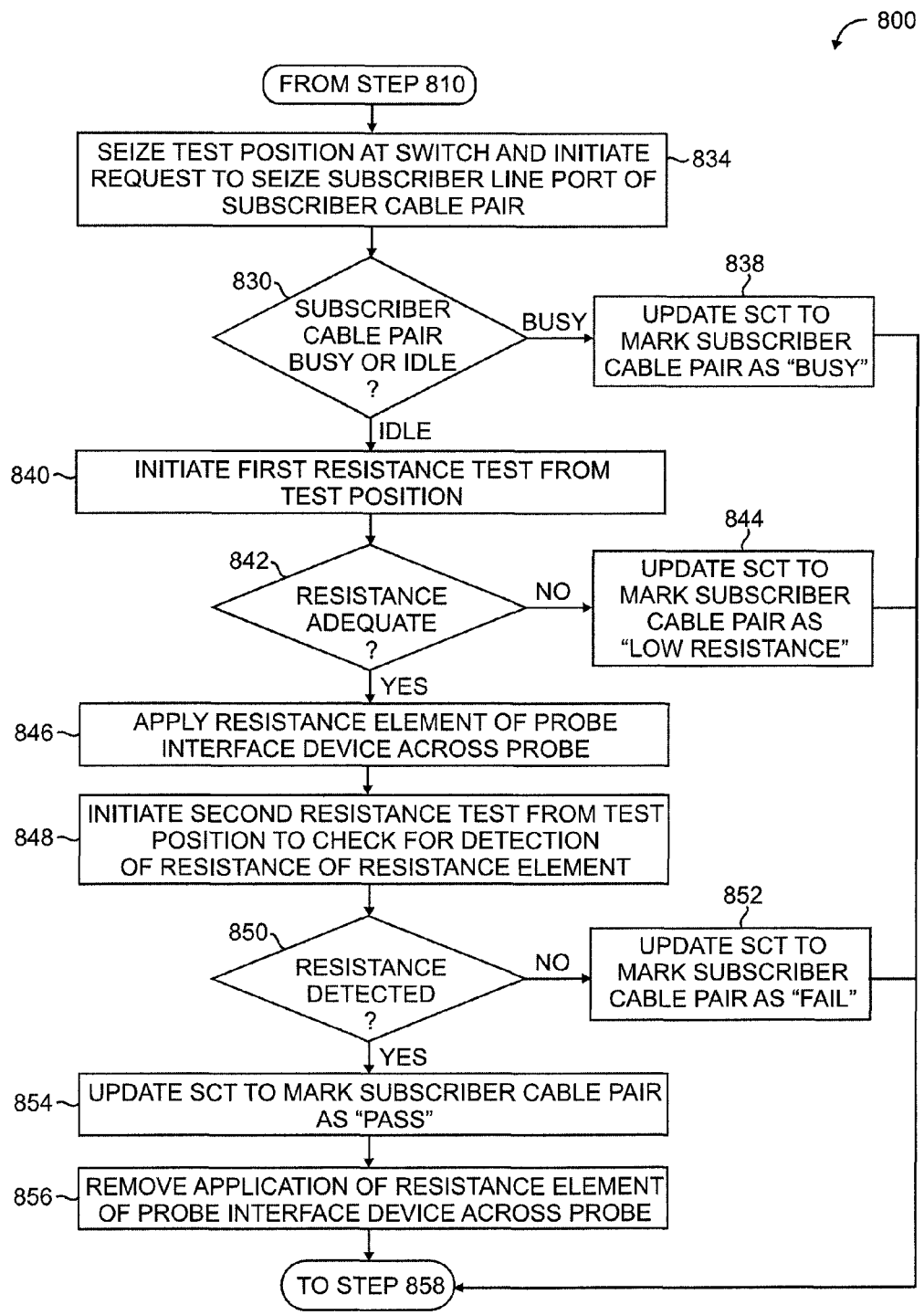
Figure 8D:
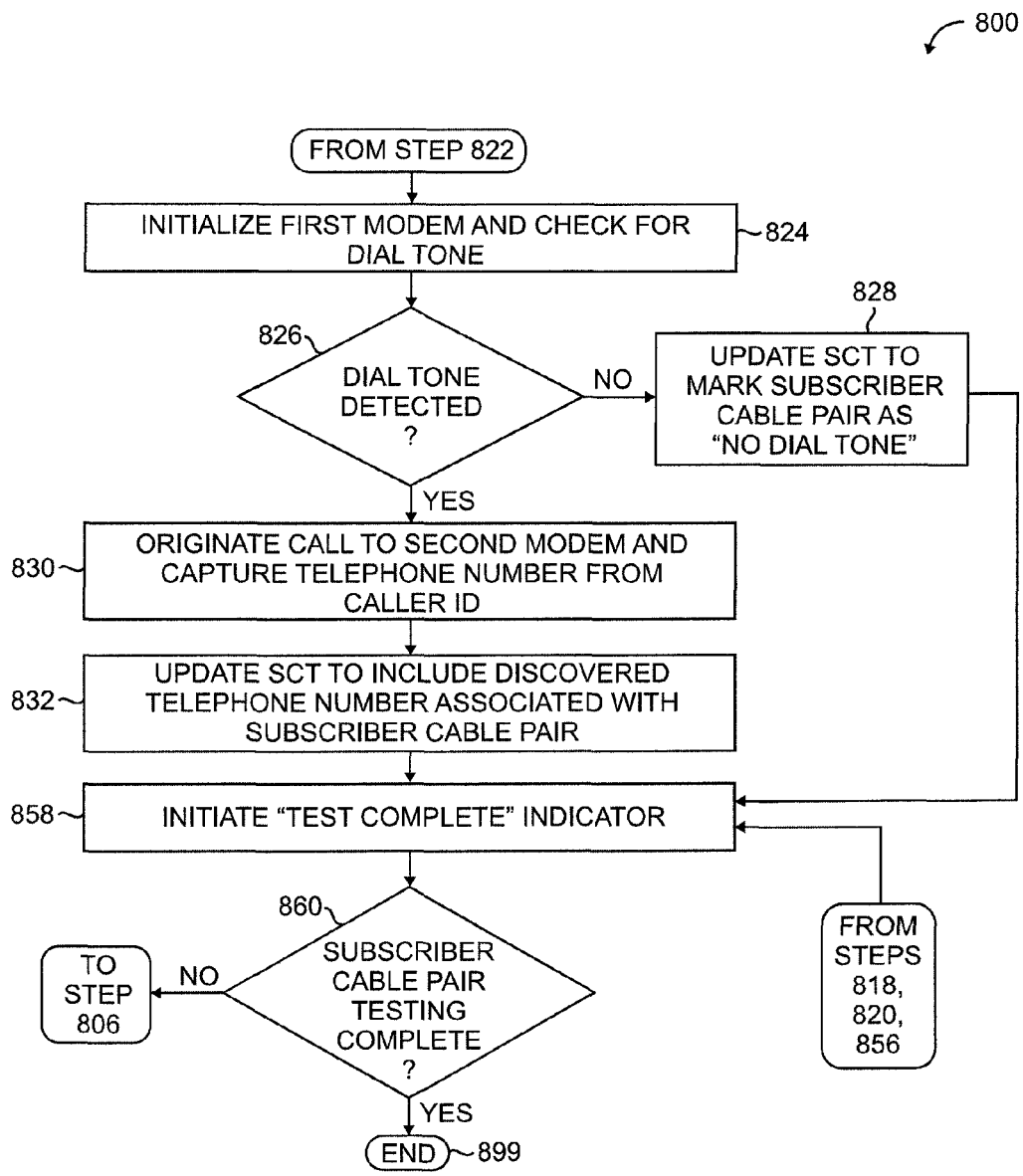

The ISDN resistor control module 350 is configured to support subscriber cable pair identification for ISDN-based subscriber cable pairs 120. The ISDN resistor control module 350, for a given ISDN-based subscriber cable pair 120 that is currently under test, is configured for use in applying a resistance element (e.g., a 22K resistor, an approximately 22K resistor, or any other suitable resistance element) across the probe 169 (and, thus, across the ISDN-based subscriber cable pair 120 when the probe 169 is connected to the ISDN-based subscriber cable pair 120) in order to validate the ISDN-based subscriber cable pair 120. An exemplary ISDN resistor control module 350 is depicted in FIG. 7. The computing device 161 is configured to control testing of the ISDN-based subscriber cable pair 120 that is currently under test, including controlling application of the resistance element (illustratively, a 22K resistor labeled as "ISDN RESISTOR" in FIG.

7, although, as noted above, other suitable resistance elements may be used) across the tip and ring leads of the probe 169 by setting the "DTR" lead high. It will be appreciated that ISDN resistor control module 350 may be implemented in various other ways (e.g., using circuit components having other values, using other types or arrangements of circuit components, or the like, as well as various combinations thereof) while still providing the various functions presented herein as being performed by ISDN resistor control module 350.

It will be appreciated that the various modules of exemplary probe interface device 300 may be interconnected in various ways to provide various functions presented herein. Thus, it will be appreciated that, although connections between modules of exemplary probe interface device 300 of FIG. 3 have been omitted from FIG. 3 for purposes of clarity, exemplary embodiments of connections between modules of exemplary probe interface device 300 of FIG. 3 are depicted via, and may be determined from, use of common elements in FIGS. 4-7 which depict exemplary embodiments of modules of exemplary probe interface device 300 of FIG. 3.

It will be appreciated that the functions of the subscriber cable pair identification assembly 160 of FIG. 1 (and the associated elements and modules depicted and described with respect to FIGS. 2-7) may be better understood by way of reference to FIGS. 8A-8D, which depict an exemplary embodiment of a method for subscriber cable pair validation for both POTS-based subscriber cable pairs and ISDN-based subscriber cable pairs.

FIGS. 8A-8D depict an exemplary embodiment of a method for subscriber cable pair validation for a set of subscriber cable pairs. The exemplary method 800 of FIGS. 8A-8D primarily represent steps performed by a computing device (e.g., the computing device 161 of FIG. 1) for performing subscriber cable pair validation for a set of subscriber cable pairs. It will be appreciated that various steps performed by the computing device may trigger execution of functions by other associated elements such as an associated probe interface device (e.g., the probe interface device 165 of FIG. 1), a switch that is serving the subscriber cable pairs (e.g., the TDM switch 150), or the like. It will be appreciated that, although primarily depicted and described as being performed serially, at least a portion of the steps of method 800 of FIGS. 8A-8D may be performed contemporaneously or in a different order than as presented in FIGS. 8A-8D.

At step 801, method 800 begins.

At step 802, a subscriber connection table (SCT) is loaded. The SCT includes subscriber connection information. The subscriber connection information includes subscriber connection information for the set of subscriber cable pairs for which subscriber cable pair validation may be performed (which may include POTS-based subscriber cable pairs, ISDN-based subscriber cable pairs, or a combination thereof). For a POTS-based subscriber cable pair, as discussed above, the subscriber connection information may include an association between the POTS-based subscriber cable pair, an expected telephone number of the POTS-based subscriber cable pair, and a subscriber line port serving the POTS-based subscriber cable pair. For an ISDN-based subscriber cable pair, as discussed above, the subscriber connection information may include an association between the ISDN-based subscriber cable pair, a telephone number of the ISDN-based subscriber cable pair, and a subscriber line port serving the ISDN-based subscriber cable pair. The subscriber connection information for a subscriber cable pair also may include other types of information (e.g., an exchange identifier, a service type indicator (e.g., denoting either POTS service or ISDN service), or the like, as well as various combinations thereof). As discussed above, the subscriber connection information may be obtained from one or more systems of the service provider (e.g., the TDM switch, a network management system (NMS), an element management system (EMS), or the like, as well as various combinations thereof) or may be obtained from any other suitable source of subscriber connection information.

The subscriber connection information initially includes the set of existing subscriber cable pair records which, as discussed herein, may include corrupted records, incomplete records, or other types of records which may need to be validated, corrected, completed, or the like. The subscriber connection information may be updated to include subscriber cable pair validation results information for any subscriber cable pairs for which subscriber cable pair verification was previously executed (e.g., a previous execution of method 800). For example, subscriber cable pair validation results information may include, for a given line of a subscriber, a telephone number and line port discovered as being associated with the subscriber cable pair, an indication of a result of testing of the line of the subscriber, or the like.

The SCT including the subscriber connection information may be maintained as a spreadsheet. An exemplary spreadsheet including subscriber connection information is depicted and described in FIG. 9. It will be appreciated that, although primarily depicted and described with respect to embodiments in which the subscriber connection information is maintained in a table (namely, the SCT), the subscriber connection information may be maintained in any other suitable format (e.g., as a collection of interrelated tables, using one or more other data structures, or the like, as well as various combinations thereof).

At step 804, the subscriber cable pair identification program is initiated. The subscriber cable pair identification program may be initiated automatically or responsive to a manually selection by a user via the computing device. From step 804, method 800 proceeds to step 806.

At step 806, the probe is positioned at the MDF block under test and the subscriber cable pair to be tested is selected from the SCT. From step 806, method 800 proceeds to step 808.

At step 808, testing of the selected subscriber cable pair is initiated. The testing of the selected subscriber cable pair may be initiated automatically (e.g., responsive to selection of the subscriber cable pair to be tested, after expiration of a timer started following selection of the subscriber cable pair to be tested, or the like), responsive to a manually selection by a user via the computing device, or the like. In the case of a manual selection, the testing of the selected subscriber cable pair may be initiated may be initiated via selection of a START TEST button displayed on the computing device, via selection of a particular key on a keyboard of the computing device (e.g., the F12 key or any other suitable key), or the like. From step 808, method 800 proceeds to step 810.

At step 810, the RTS lead is set high, and High Voltage and Low Voltage are detected over the CTS and DCD leads, respectively.

If the DCD lead is set high, thereby indicating that a low voltage associated with POTS service is present (e.g., less than 80V, but greater than 5V), method 800 proceeds to step 812 (which is the beginning of subscriber cable pair validation testing for POTS-based subscriber lines). Here, since the line may be busy (e.g., typically having a voltage between 5V and 20V) or idle (e.g., typically having a voltage between at or near 48V), and the low voltage relay will be set in either case, a low voltage indicator is set for the subscriber cable pair (for potential use in step 816 to determine whether the subscriber cable pair is busy or open).

If the CTS lead is set high, thereby indicating that a high voltage associated with ISDN service (e.g., equal to or greater than 80V) is present, method 800 proceeds to step 834 (which is the beginning of subscriber cable pair validation testing for ISDN-based subscriber lines). The ISDN subscriber cable pair validation process is depicted and described with respect to steps 834-856.

It will be appreciated that this step may be performed using a POTS/ISDN control module (e.g., POTS/ISDN control module 320 of FIG. 3) and a POTS/ISDN voltage detection module (e.g., POTS/ISDN voltage detection module 330 of FIG. 3).

At step 812, the RTS lead is set low, and 48V forward and reverse voltages are detected over the CTS and DCD leads, respectively. If the CTS lead is set high, thereby indicating that a 48V forward POTS voltage is present, an indication of the 48V forward POTS voltage is stored and method 800 proceeds to step 814. If the DCD lead is set high, thereby indicating that a 48V reverse POTS voltage is present, an indication of the 48V reverse POTS voltage is stored and method 800 proceeds to step 814. If neither the CTS lead nor the DCD lead is set high, method 800 proceeds to step 814.

At step 814, a determination is made as to whether the CTS lead is set high or the DCD lead is set high. If a determination is made that neither the CTS lead nor the DCD lead is set high, method 800 proceeds to step 816. If a determination is made that either the CTS lead or the DCD lead is set high, method 800 proceeds to step 822.

At step 816, a determination is made as to whether the low voltage indicator for the subscriber cable pair has been set. This is a reference to potential setting of the low voltage indicator in step 810 when it is determined that the DCD lead is set high (thereby indicating that a low voltage associated with POTS service is present and forward or reverse 48V is not present). If the low voltage indicator for the subscriber cable pair has been set, method 800 proceeds to step 818, at which point the SCT is updated to mark the subscriber cable pair as being busy ("BUSY"). If the low voltage indicator for the subscriber cable pair has not been set, method 800 proceeds to step 820, at which point the SCT is updated to mark the subscriber cable pair as being open ("OPEN"). From steps 818 and 820, method 800 proceeds to step 858 (at which point an indication that the test of the selected subscriber cable pair is complete is presented).

At step 822, the subscriber cable pair is identified as being idle and a POTS telephone number identification process is initiated. The POTS telephone number identification process is depicted and described with respect to steps 824-832.

At step 824, a first modem of the computing device is initialized and a dial tone check is performed via the first modem. As depicted in FIG. 1, the first modem of the computing device is communicatively connected to the probe interface device. The dial tone check is a determination as to whether the subscriber cable pair has a dial tone associated therewith.

At step 826, a determination is made as to whether a dial tone is detected for the subscriber cable pair. If a dial tone is not detected for the subscriber cable pair, method 800 proceeds to step 828. If a dial tone is detected for the subscriber cable pair, method 800 proceeds to step 830.

At step 828, the SCT is updated to mark the subscriber cable pair as not having a dial tone ("NO DIAL TONE" or "NODT"). From step 828, method 800 proceeds to step 858 (at which point an indication that the test of the selected subscriber cable pair is complete is presented).

At step 830, a telephone call is originated to a second modem of the computing device and the telephone number of the subscriber cable pair is captured using the caller ID feature associated with the terminating line connected to the second modem of the computing device. The captured telephone number is the telephone number associated with the subscriber cable pair. As depicted in FIG. 1, the second modem of the computing device is configured for communication with the POTS port of the TDM switch.

At step 832, the SCT is updated to include the discovered telephone number associated with the subscriber cable pair. From step 832, method 800 proceeds to step 858 (at which point an indication that the test of the selected subscriber cable pair is complete is presented).

At step 834, a test position at the TDM switch is seized and a request to seize the subscriber line port of the subscriber cable pair at the TDM switch is initiated. The test position may be seized responsive to a determination that a high voltage is resident on the subscriber cable pair (e.g., a voltage indicative that the subscriber cable pair is an ISDN-based subscriber cable pair), as discussed in conjunction with step 810. The test position on the TDM switch may be seized using one or more messages (e.g., one or more CLI level commands) sent from the computing device to the test position on the TDM switch (via the MTU circuitry and the OMT port of the TDM switch). The request to seize the subscriber line port on the TDM switch may be initiated by sending one or more messages (e.g., one or more CLI level commands) from the computing device to the test position on the TDM switch (via the MTU circuitry and the OMT port of the TDM switch).

At step 836, a determination is made as to whether the subscriber cable pair is busy or idle. The TDM switch, responsive to the request to seize the subscriber line port of the subscriber cable pair at the TDM switch, determines whether the subscriber cable pair is busy or idle. If the subscriber cable pair is busy, the subscriber line port is not seized, an indication that the subscriber cable pair is busy is received by the computing device from the TDM switch, and, thus, method 800 proceeds to step 838. If the subscriber cable pair is idle, the subscriber line port is seized, an indication that the subscriber cable pair is idle is received by the computing device from the TDM switch, and, thus, method 800 proceeds to step 840.

At step 838, the SCT is updated to mark the subscriber cable pair as being busy ("BUSY"). From step 838, method 800 proceeds to step 858 (at which point an indication that the test of the selected subscriber cable pair is complete is presented).

At step 840, a first resistance test is initiated from the test position of the TDM switch. The first resistance test may include a determination as to whether a resistance associated with the test position (and, thus, associated with the subscriber line port via the test position) is adequate (e.g., adequate for a normal subscriber loop). The determination as to whether the resistance associated with the test position is adequate may include a determination as to whether the resistance associated with the test position satisfies a resistance threshold. For example, the resistance threshold may be 200K, approximately or about 200K, or any other suitable resistance value. The resistance associated with the test position may be determined to be adequate based on a determination that the resistance associated with the test position is greater than (or great than or equal to) the resistance threshold and may be determined to be inadequate based on a determination that the resistance associated with the test position is less than (or less than or equal to) the resistance threshold.

At step 842, a determination is made as to whether the resistance associated with the test position (and, thus, associated with the subscriber line port via the test position) is adequate. If the resistance associated with the test position is inadequate, method 800 proceeds to step 844. If the resistance associated with the test position is adequate, method 800 proceeds to step 846.

At step 844, the SCT is updated to mark the subscriber cable pair as having low resistance ("LRES"). From step 844, method 800 proceeds to step 858 (at which point an indication that the test of the selected subscriber cable pair is complete is presented).

At step 846, a resistance element of the probe interface device is applied across the probe. The resistance of the probe interface device may be applied across the probe by setting the DTR lead to high. The resistance element of the probe interface device may be a resistor or any other suitable resistance element. The resistance element of the probe interface device may have a resistance of 22K, approximately or about 22K, or any other suitable resistance value. It is noted that the resistance of the resistance element of the probe interface device is a known resistance value, such that the computing device may be configured to determine whether that known resistance value is detected from the test position of the TDM switch (as discussed further below). The resistance element of the probe interface device may be applied across the tip and ring leads of the probe. The application of the resistance element of the probe interface device across the probe may be performed using an ISDN resistor control module (e.g., ISDN resistor control module 350 of FIG. 3).

At step 848, a second resistance test is initiated from the test position of the TDM switch. The second resistance test may include a determination as to whether the resistance of the resistance element of the probe interface device (e.g., 22K or any other suitable resistance value) is detected at the test position (and, thus, detected as being associated with the subscriber line port via the test position) of the TDM switch. It is noted that the resistance of the resistance element of the probe interface device is a known resistance value, such that the computing device may be configured to determine whether that known resistance value is detected during the second resistance test that is initiated from the test position of the TDM switch.

At step 850, a determination is made as to whether the resistance of the resistance element of the probe interface device is detected at the test position (and, thus, detected as being associated with the subscriber line port via the test position) of the TDM switch. If the resistance of the resistance element of the probe interface device is not detected at the test position of the TDM switch, method 800 proceeds to step 852. If the resistance of the resistance element of the probe interface device is detected at the test position of the TDM switch, method 800 proceeds to step 854.

At step 852, the SCT is updated to mark the subscriber cable pair as having a failure condition associated therewith ("FAIL"). This may indicate that the subscriber cable pair has been identified as being in a non-operable state (e.g., being in a failed state or some other non-operable state preventing detection of the resistance of the resistance element of the probe interface device at the test position). From step 852, method 800 proceeds to step 858 (at which point an indication that the test of the selected subscriber cable pair is complete is presented).

At step 854, the SCT is updated to mark the subscriber cable pair as having passed testing ("PASS"). This may indicate that the subscriber cable pair has been identified as being in an operable state. From step 854, method 800 proceeds to step 856.

At step 856, application of the resistance element of the probe interface device across the probe is removed. The application of the resistance of the probe interface device may be across the probe may be removed by setting the DTR lead to low. The removal of the application of the resistance element of the probe interface device across the probe may be performed using an ISDN resistor control module (e.g., ISDN resistor control module 350 of FIG. 3). From step 856, method 800 proceeds to step 858.

At step 858, an indication that the test of the selected subscriber cable pair is complete is presented. The indication that the test of the selected subscriber cable pair is complete may be presented in any suitable manner (e.g., a popup displayed on a screen on which the SCT is displayed, marking or highlighting a portion of the subscriber cable pair in the SCT, or the like, as well as various combinations thereof). An exemplary spreadsheet-based implementation of the SCT is presented in FIG. 9.

At step 860, a determination is made as to subscriber cable pair testing is complete. If subscriber cable pair testing is not complete, method 800 returns to step 806 to begin testing of a next subscriber cable pair to be tested. If subscriber cable pair testing is complete, method 800 proceeds to step 899 (where method 800 ends).

At step 899, method 800 ends.

Figure 9:
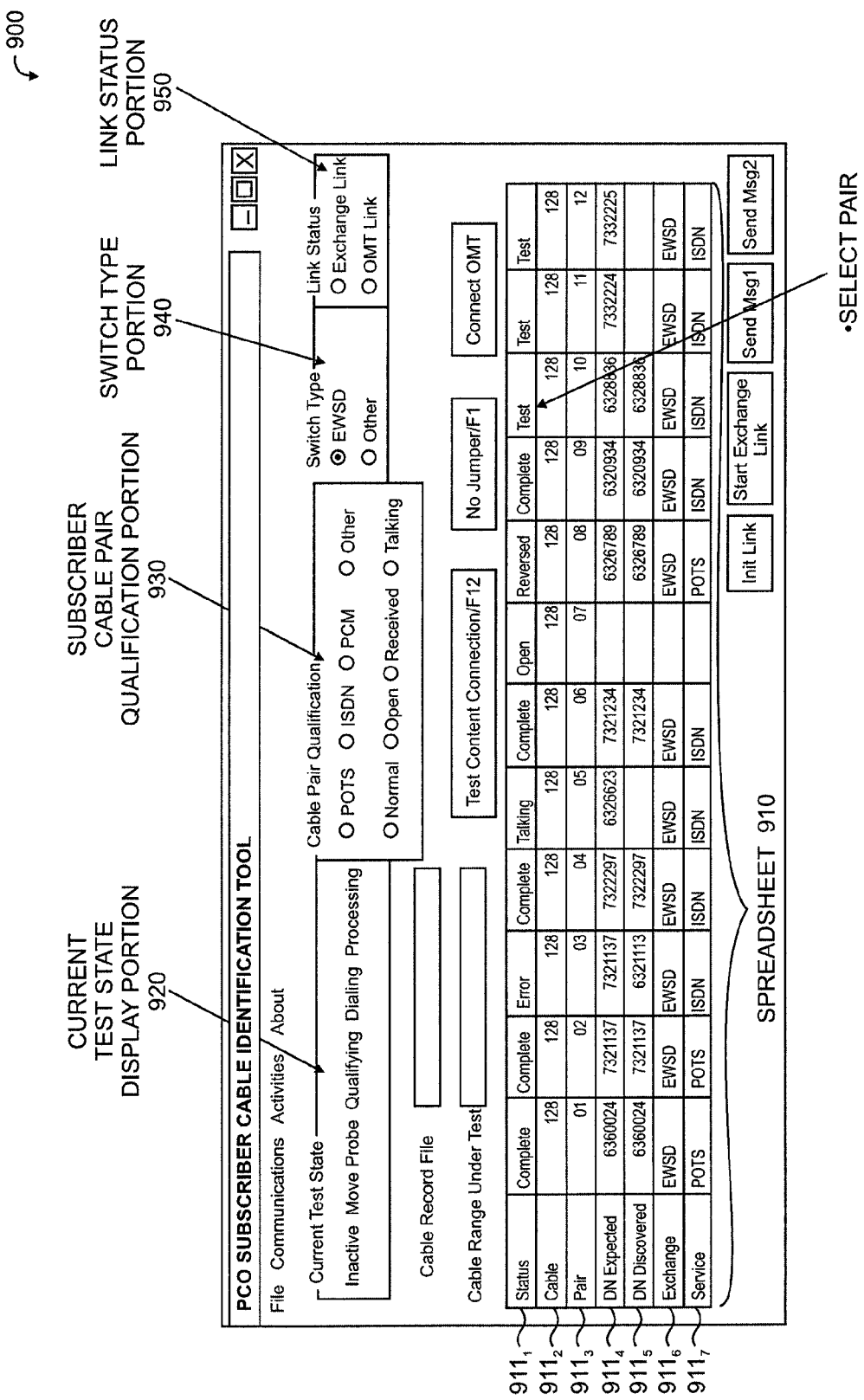
FIG. 9 depicts an exemplary interface configured for controlling testing of subscriber cable pairs and including a spreadsheet that includes subscriber cable pair identification data.

FIG. 9 depicts an exemplary interface configured for controlling testing of subscriber cable pairs and including a spreadsheet that includes subscriber cable pair identification data.

As depicted in FIG. 9, interface 900 includes a subscriber cable pair spreadsheet 910. The subscriber cable pair spreadsheet 910 maintains subscriber cable pair identification data (such as subscriber cable pair identification data 222 depicted and described with respect to FIG. 2). The subscriber cable pair spreadsheet 910 also may be suitable for use as the SCT depicted and described with respect to method 800 of FIG. 8.

As depicted in FIG. 9, subscriber cable pair spreadsheet 910 includes subscriber cable pair identification data for a set of subscriber cable pairs (illustratively, for 12 subscriber cable pairs). It will be appreciated that the subscriber cable pair spreadsheet 910 may include subscriber cable pair identification data for fewer or more subscriber cable pairs. It also will be appreciated that subscriber cable pair identification data for fewer or more subscriber cable pairs may be displayed in the spreadsheet at any given time (e.g., the user may be provided with a capability to scroll in order to change the set of subscriber cable pairs displayed, may be provided with a capability to load different sets of subscriber cable pairs for display within spreadsheet 900, or the like, as well as various combinations thereof.

As depicted in FIG. 9, subscriber cable pair spreadsheet 910 includes a set of rows $911_1$-$911_7$ (collectively, rows 911), including a testing status row $911_1$ (denoted as "Status"), a cable identifier row $911_2$ (denoted as "Cable"), a pair identifier row $911_3$ (denoted as "Pair"), an expected telephone number row $911_4$ (denoted as "DN Expected"), a discovered telephone number row $911_5$ (denoted as "DN Discovered"), a switch type row $911_6$ (denoted as "Exchange"), and a service type row $911_6$ (denoted as "Service"). It will be appreciated that the rows 911 may be organized in other ways. It will be appreciated that spreadsheet 910 may include fewer or more rows 911 (which may include other or additional types of subscriber cable pair identification data). As a result of rows 911, the subscriber cable pair identification data for each of the subscriber cable pairs is organized in columns, respectively. It will be appreciated that subscriber cable pair identification data for a set of subscriber cable pairs may be organized in various other ways.

As depicted in FIG. 9, testing has been attempted for 9 of the 12 subscriber cable pairs depicted in subscriber cable pair spreadsheet 910 (the 9 subscriber cable pairs to the left of the spreadsheet 910), testing is currently in progress for 1 of the 12 subscriber cable pairs, and testing has not been attempted for 2 of the 12 subscriber cable pairs depicted in subscriber cable pair spreadsheet 910 (the 2 subscriber cable pairs to the right of the spreadsheet 910 which are marked as "Test" in testing status row $911_1$).

As discussed herein, testing of a subscriber cable pair may be initiated from interface 900 in various ways (e.g., selecting or highlighting a column of spreadsheet 910 and pressing a button (e.g., F12 key or any other suitable button or key) or selecting a menu item (e.g., from the FILE menu displayed on interface 900, selecting the subscriber cable pair from a menu of interface 900 (e.g., from a menu items displayed following selection of the FILE menu displayed on interface 900), or the like. It will be appreciated that interface 900 (including the arrangement of spreadsheet 910) enables the technician which is testing the subscriber cable pairs to move between subscriber cable pairs efficiently, thereby improving testing efficiency.

For the first, second, fourth, sixth, and ninth subscriber cable pairs in the spreadsheet 900 (Cable 128, Pairs 01, 02, 04, 06, and 09, respectively), it may be seen from spreadsheet 900 that testing of these subscriber cable pairs has been successfully completed and that the discovered telephone numbers match the expected telephone numbers for the subscriber cable pairs.

For the third subscriber cable pair in the spreadsheet 900 (Cable=128, Pair=03), it may be seen from spreadsheet 900 that testing of this subscriber cable pair has been completed, but that the discovered telephone number does not match the expected telephone number for the subscriber cable pair (and, thus, the testing status row $911_1$ is marked as "Error').

For the fifth subscriber cable pair in the spreadsheet 900 (Cable=128, Pair=05), it may be seen from spreadsheet 900 that the subscriber cable pair was determined to be in a busy state (illustratively, the testing status row $911_1$ is marked as "Talking') and, thus, testing of the subscriber cable pair was not performed so as not to disrupt use of the subscriber cable pair by the associated subscriber. It is noted that marking of the testing status row $911_1$ of spreadsheet 900 in this manner may be performed as described with respect to step 818 (and any associated steps) of method 800 of FIG. 8.

For the seventh subscriber cable pair in the spreadsheet 900 (Cable=128, Pair=07), it may be seen from spreadsheet 900 that the subscriber cable pair was determined to be in an open state (illustratively, the testing status row $911_1$ is marked as "Open') and, thus, testing of the subscriber cable pair cannot be performed. It is noted that marking of the testing status row $911_1$ of spreadsheet 900 in this manner may be performed as described with respect to step 820 (and any associated steps) of method 800 of FIG. 8.

For the eighth subscriber cable pair in the spreadsheet 900 (Cable=128, Pair=08), it may be seen from spreadsheet 900 that testing of the subscriber cable pair has been completed and that the discovered telephone number matches the expected telephone number for the subscriber cable pair, but that wiring of the tip and ring leads is connected in reverse of the standard (thus, the testing status row $911_1$ is marked as "Reversed').

For the tenth subscriber cable pair in the spreadsheet 900 (Cable=128, Pair=10), it may be seen from spreadsheet 900 that testing of the subscriber cable pair is in process and that the discovered telephone number matches the expected telephone number for the subscriber cable pair, but that testing of the subscriber cable pair is not yet complete (and, thus, the testing status row $911_1$ is still marked as "Test'). As further depicted in FIG. 9, interface 900 also includes a Current Test State display portion 920 including status indicators (illustratively, Inactive, Move Probe, Qualifying, Dialing, Processing) which may be highlighted as testing of the subscriber cable pair proceeds.

For the eleventh and twelfth subscriber cable pairs in the spreadsheet 900 (Cable=128, Pairs 11 and 12, respectively), it may be seen from spreadsheet 900 that testing of the subscriber cable pair has not yet been initiated (and, thus, the testing status row $911_1$ is still marked as "Test'). As discussed above, following completion of testing of the tenth subscriber cable pair, the technician can easily initiate testing the eleventh subscriber cable pair (e.g., by simply selecting the column of spreadsheet 910 associated with the eleventh subscriber cable pair and using one or more controls of interface 900 to initiate testing).

As further depicted in FIG. 9, interface 900 also includes various other portions configured to provide testing controls and status information to the technician performing testing of the subscriber cable pairs. For example, interface 900 also includes a Cable Pair Qualification portion 930 that is configured to present subscriber cable pair type (e.g., POTS, ISDN, PCM, Other, or the like) and state (e.g., Normal, Open, Reversed, Talking, or the like) information, a Switch Type portion 940 configured to enable the selection of the switch type (e.g., Electronic World Switch Digital (EWSD), OTHER, or the like) of the switch that is supporting service for the subscriber cable pairs being tested, and a Link Status portion 950 that is configured to present link status information (e.g., Exchange Link, OMT Link, or the like). As discussed above, the switch type determines the correct 48V orientation relative to the wiring of the Tip and Ring leads on the subscriber cable pair (and the computing device may determine the correct 48V orientation from the switch type information of the Switch Type portion 940 of the interface 900 of FIG. 9). As further depicted in FIG. 9, interface 900 also includes various other controls and information which may be used to facilitate one or more of initiation of testing, execution of testing, display of testing results, or the like, as well as various combinations thereof.

It will be appreciated that, although primarily depicted and described herein with respect type of interface 900, interface 900 may be implemented in various other ways (e.g., using other controls, fields, arrangements of data, or the like) in order to support various functions of the subscribe cable pair identification capability.

Various embodiments of the subscriber cable pair identification capability provide improvements over existing tests for POTS or ISDN services, which are highly manual, by automating subscriber cable pair identification at the MDF. Various embodiments of the subscriber cable pair identification capability provide improvements over existing tests for POTS or ISDN services which are only able to validate the wired path, but are unable to validate associations between subscriber telephone numbers and subscriber cable pairs. Various embodiments of the subscriber cable pair identification capability obviate the need for more than one technician in order to perform subscriber cable pair identification for POTS or ISDN services. Various embodiments of the subscriber cable pair identification capability obviate the need for manual recordation of subscriber cable pair identification results, thereby improving efficiency and reducing errors associated with recording the results of subscriber cable pair identification. For example, at least some embodiments of the subscriber cable pair identification capability have been determined to require only approximately 30 seconds to validate subscriber cable pairs and associated subscriber cable pair information.

Figure 10:
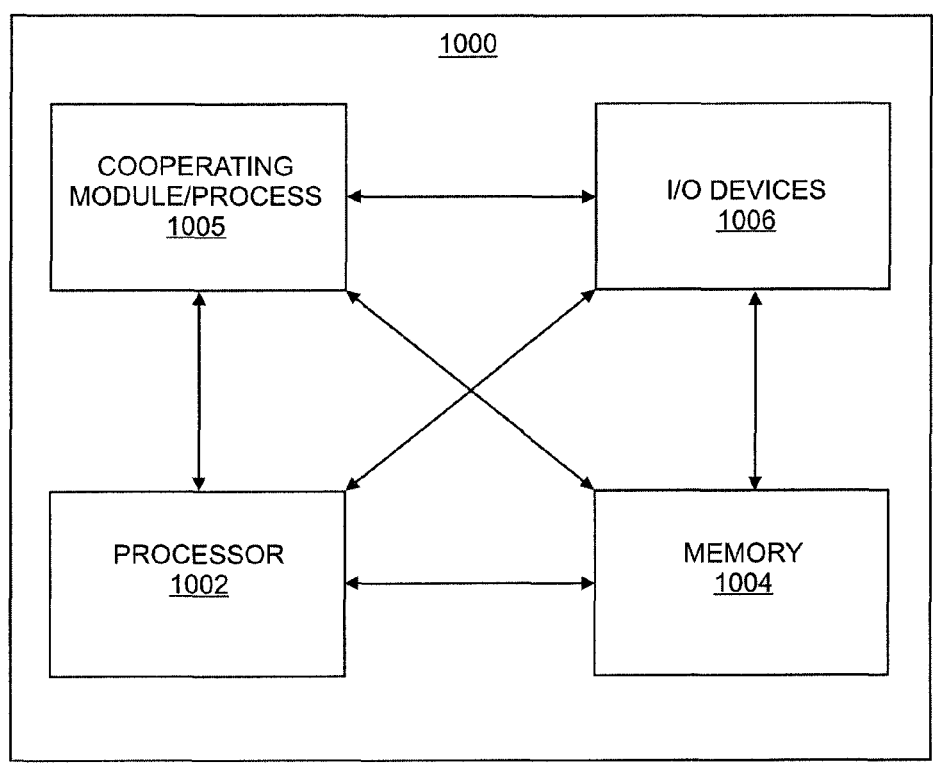
FIG. 10 depicts a high-level block diagram of a computer suitable for use in performing functions presented herein.

FIG. 10 depicts a high-level block diagram of a computer suitable for use in performing functions described herein.

The computer 1000 includes a processor 1002 (e.g., a central processing unit (CPU) and/or other suitable processor(s)) and a memory 1004 (e.g., random access memory (RAM), read only memory (ROM), or another suitable storage device).

The computer 1000 also may include a cooperating module/process 1005. The cooperating process 1005 can be loaded into memory 1004 and executed by the processor 1002 to implement functions as discussed herein and, thus, cooperating process 1005 (including associated data structures) can be stored on a computer readable storage medium, e.g., RAM memory, magnetic or optical drive or diskette, and the like.

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1000 depicted in FIG. 10 provides a general architecture and functionality suitable for implementing functional elements described herein and/or portions of functional elements described herein. For example, computer 1000 provides a general architecture and functionality suitable for implementing one or more of subscriber terminals 110, MDF 130, TDM switch 150, computing device 161, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
control application of a resistance element of a probe interface device across a probe configured to be connected to a unit supporting a subscriber cable pair;
control validation of a resistance associated with a test position of a switch serving the subscriber cable pair, wherein, to control validation of the resistance associated with the test position of the switch, the processor is configured to send a message for determining the resistance associated with the test position of the switch and determine whether the resistance associated with the test position of the switch satisfies a resistance threshold; and
determine whether a resistance of the resistance element is detected at the test position of the switch.

2. The apparatus of claim 1, wherein the processor is configured to:
propagate a request to seize the test position of the switch serving the subscriber cable pair.

3. The apparatus of claim 2, wherein the processor is configured to propagate the request to seize the test position based on a determination that the subscriber cable pair is an Integrated Services Digital Network (ISDN) subscriber cable pair.

4. The apparatus of claim 1, wherein the processor is configured to:
propagate a request to seize a subscriber line port of the switch serving the subscriber cable pair.

5. The apparatus of claim 4, wherein the processor is configured to propagate the request to seize the subscriber line port based on a determination that the test position of the switch has been seized.

6. The apparatus of claim 4, wherein the processor is configured to:
receive a response to the request to seize the subscriber line port; and
determine, based on the response, whether the subscriber line port is busy or idle.

7. The apparatus of claim 1, wherein the processor is configured to initiate validation of the resistance associated with the test position of the switch based on a determination that the subscriber cable pair is idle.

8. The apparatus of claim 1, wherein the resistance threshold is about 200K.

9. The apparatus of claim 1, wherein the processor is configured to initiate application of the resistance element of the probe interface device across the probe based on a determination that the resistance associated with the test position of the switch satisfies the resistance threshold.

10. The apparatus of claim 1, wherein the resistance element comprises a 22K resistor.

11. An apparatus, comprising:
a processor and a memory communicatively connected to the processor, the processor configured to:
control application of a resistance element of a probe interface device across a probe configured to be connected to a unit supporting a subscriber cable pair; and
determine whether a resistance of the resistance element is detected at a test position of a switch serving the subscriber cable pair;

wherein the processor is configured to initiate application of the resistance element of the probe interface device across the probe based on a determination that a resistance associated with the test position of the switch satisfies a resistance threshold.

12. The apparatus of claim 11, wherein, to control application of the resistance element of the probe interface device across the probe, the processor is configured to:

propagate a control signal toward the probe interface device.

13. The apparatus of claim 12, wherein, to propagate the control signal toward the probe interface device, the processor is configured to:

set an RS-232 Data Terminal Ready (DTR) lead to a HIGH state.

14. The apparatus of claim 11, wherein the resistance element comprises a 22K resistor.

15. An apparatus, comprising:

a processor and a memory communicatively connected to the processor, the processor configured to:

control application of a resistance element of a probe interface device across a probe configured to be connected to a unit supporting a subscriber cable pair;

determine whether a resistance of the resistance element of the probe interface device is detected at a test position of a switch serving the subscriber cable pair; and based on a determination that the resistance of the resistance element of the probe interface device is not detected, identify the subscriber cable pair as being in a non-operable state.

16. The apparatus of claim 15, wherein the resistance element comprises a 22K resistor.

17. An apparatus, comprising:

a processor and a memory communicatively connected to the processor, the processor configured to:

control application of a resistance element of a probe interface device across a probe configured to be connected to a unit supporting a subscriber cable pair;

determine whether a resistance of the resistance element of the probe interface device is detected at a test position of a switch serving the subscriber cable pair; and based on a determination that the resistance of the resistance element of the probe interface device is detected, identify the subscriber cable pair as being in an operable state.

18. The apparatus of claim 17, wherein the resistance element comprises a 22K resistor.

* * * * *